US011086436B2

(12) United States Patent
Kim et al.

(10) Patent No.: US 11,086,436 B2
(45) Date of Patent: *Aug. 10, 2021

(54) ELECTRONIC DEVICE COMPRISING PLURALITY OF DISPLAYS AND METHOD FOR OPERATING SAME

(71) Applicant: Samsung Electronics Co., Ltd., Suwon-si (KR)

(72) Inventors: Joon-Hwan Kim, Yongin-si (KR); Sun-Hee Moon, Hwaseong-si (KR); John Lee, Gunpo-si (KR); Won-Sik Lee, Seongnam-si (KR); Hyun-Yeul Lee, Seoul (KR); Seung-Yeon Chung, Seoul (KR); Hye-Min Ha, Suwon-si (KR); Kyung-Wha Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

This patent is subject to a terminal disclaimer.

(21) Appl. No.: 15/773,901

(22) PCT Filed: Nov. 1, 2016

(86) PCT No.: PCT/KR2016/012448
§ 371 (c)(1),
(2) Date: May 4, 2018

(87) PCT Pub. No.: WO2017/078367
PCT Pub. Date: May 11, 2017

(65) Prior Publication Data
US 2018/0331991 A1    Nov. 15, 2018

(30) Foreign Application Priority Data

Nov. 6, 2015 (KR) .................. 10-2015-0156133

(51) Int. Cl.
*G06F 3/041* (2006.01)
*G06F 3/14* (2006.01)
(Continued)

(52) U.S. Cl.
CPC .......... *G06F 3/0416* (2013.01); *G06F 1/1618* (2013.01); *G06F 1/1626* (2013.01);
(Continued)

(58) Field of Classification Search
CPC ...... G06F 1/1616; G06F 1/1618; G06F 1/162; G06F 2200/1614
See application file for complete search history.

(56) References Cited

U.S. PATENT DOCUMENTS 8,890,802 B2 * 11/2014 Case, Jr. ............... G06F 1/1616
345/156
10,248,224 B2 * 4/2019 Klein .................... G06F 1/1641
(Continued)

FOREIGN PATENT DOCUMENTS

CN    101030982 A    9/2007
CN    101208937 A    6/2008
(Continued)

OTHER PUBLICATIONS

European Search Report dated Jul. 27, 2018, issued in the European Application No. 16862383.3.
(Continued)

*Primary Examiner* — Samantha Yuehan Wang
(74) *Attorney, Agent, or Firm* — Jefferson IP Law, LLP

(57) ABSTRACT

A method for operating an electronic device, which includes a first body unit, a second body unit which is hinge-coupled to the first body unit such that one side, a first display which is disposed on the other side of the first body unit and faces a first direction, a second display which is disposed on the other side of the second body unit and faces a second
(Continued)

direction, a sensor which is for obtaining direction information of the electronic device, and a processor configured to display on the first display an execution screen of a first application, determine whether the electronic device is flipped on the basis of the direction information, determine a second application for displaying an execution screen on the second display among a plurality of applications stored in the electronic device, and display a first execution screen of the second application on the second display.

15 Claims, 28 Drawing Sheets

(51) Int. Cl.
| | |
|---|---|
| *G06F 3/0488* | (2013.01) |
| *H04M 1/02* | (2006.01) |
| *G06F 1/16* | (2006.01) |
| *G06F 3/0487* | (2013.01) |
| *G06F 3/0486* | (2013.01) |
| *H04L 12/58* | (2006.01) |

(52) U.S. Cl.
CPC .......... *G06F 1/1643* (2013.01); *G06F 1/1677* (2013.01); *G06F 1/1681* (2013.01); *G06F 3/0486* (2013.01); *G06F 3/0487* (2013.01); *G06F 3/0488* (2013.01); *G06F 3/04883* (2013.01); *G06F 3/14* (2013.01); *H04L 51/04* (2013.01); *H04L 51/24* (2013.01); *H04M 1/0214* (2013.01); *H04M 1/0243* (2013.01); *G06F 2200/1614* (2013.01); *H04M 2250/16* (2013.01)

(56) References Cited

U.S. PATENT DOCUMENTS

| | | |
|---|---|---|
| 2002/0180767 A1 | 12/2002 | Northway et al. |
| 2006/0264243 A1 | 11/2006 | Aarras |
| 2010/0302179 A1 | 12/2010 | Ahn et al. |
| 2011/0302179 A1 | 12/2011 | Agrawal |
| 2013/0012273 A1 | 1/2013 | Sato |
| 2013/0321264 A1 | 12/2013 | Park et al. |
| 2013/0321340 A1* | 12/2013 | Seo ................. G06F 3/04883 345/174 |
| 2015/0227225 A1 | 8/2015 | Park et al. |
| 2015/0279329 A1 | 10/2015 | Qiu |
| 2016/0098063 A1* | 4/2016 | Lee .................. G06F 1/1662 345/659 |
| 2018/0321892 A1* | 11/2018 | Kim .................. G06F 1/1601 |

FOREIGN PATENT DOCUMENTS

| | | |
|---|---|---|
| CN | 104951258 A | 9/2015 |
| EP | 2 611 117 A1 | 7/2013 |
| EP | 2 720 141 A1 | 4/2014 |
| WO | 2011/084298 A2 | 7/2011 |
| WO | 2015/119474 A1 | 8/2015 |
| WO | 2015/167128 A1 | 11/2015 |

OTHER PUBLICATIONS

Chinese Office Action with English translation dated Aug. 13, 2020; Chinese Appln. No. 201680064847.3.

* cited by examiner (a)

(b)

(a)

(b)

(a)

(b)

(a)

(b)

ELECTRONIC DEVICE COMPRISING PLURALITY OF DISPLAYS AND METHOD FOR OPERATING SAME

CROSS-REFERENCE TO RELATED APPLICATION(S)

This application is a U.S. National Stage application under 35 U.S.C. § 371 of an International application number PCT/KR2016/012448, filed on Nov. 1, 2016, which is based on and claimed priority of a Korean patent application number 10-2015-0156133, filed on Nov. 6, 2015, in the Korean Intellectual Property Office, the disclosure of which is incorporated by reference herein in its entirety.

TECHNICAL FIELD

The present disclosure relates to an electronic device including multiple displays and an operating method thereof and, more particularly, to an electronic device, which displays various screens on each of multiple displays, and an operating method thereof.

BACKGROUND ART

An electronic device can display various pieces of information and content on a display, and can receive various inputs through the display. As described above, a display of an electronic device serves not only as a display device, which displays a screen, but also as an input means which receives an input.

Also, recently, a display having larger and more clear image quality has been applied to an electronic device, and in order to further improve the design or the utilization of an electronic device, various types of displays have been applied to the same.

Further, recently, as the portability of an electronic device is emphasized, a user uses an electronic device in various locations and places, and thus various types of electronic devices have been developed such that the electronic device can have a structure which allows the user to conveniently use the same.

DETAILED DESCRIPTION OF THE INVENTION

Technical Problem

Since the utilization of an electronic device has increased and the role thereof has diversified, in order to provide a user with an environment in which the user can more conveniently use the same, multiple displays need to be applied thereto.

Since an electronic device including multiple displays can display, on each of the multiple displays, an execution screen of an application, content, or the like, when the electronic device operates in the same scheme as an electronic device including a single display, it is difficult to fully take advantage of the multiple displays.

Differently from an electronic device including a single display, an electronic device including multiple displays needs to control the multiple displays such that a screen, which is appropriate for a form in which a user uses an electronic device, the user's intention, or the like, is displayed. Also, a form in which the multiple displays are arranged in the electronic device needs to be considered when the multiple displays are controlled.

Technical Solution

In accordance with an aspect of the present disclosure, an electronic device is provided. The electronic device may include: a first body part; a second body part hinge-coupled to the first body part such that one side thereof is capable of coming in contact with one side of the first body part; a first display disposed on a different side of the first body part and facing a first direction; a second display disposed on a different side of the second body part and facing a second direction; a sensor configured to acquire direction information of the electronic device; and a processor configured to display an execution screen of a first application on the first display, determine whether the electronic device is flipped on the basis of the direction information, determine a second application of which an execution screen is to be displayed on the second display among multiple applications stored in the electronic device, when an angle between the first and second body parts is smaller than or equal to a predetermined critical angle and the electronic device is determined to be flipped, and display a first execution screen of the second application on the second display.

In accordance with another aspect of the present disclosure, provided is an operating method of an electronic device, which includes: a first body part; a second body part hinge-coupled to the first body part such that one side thereof is capable of coming in contact with one side of the first body part; a first display disposed on a different side of the first body part and facing a first direction; a second display disposed on a different side of the second body part and facing a second direction; and a sensor configured to acquire direction information of the electronic device, the operating method including: displaying an execution screen of a first application on the first display; determining whether the electronic device is flipped on the basis of the direction information; determining a second application of which an execution screen is to be displayed on the second display among multiple applications stored in the electronic device, when an angle between the first and second body parts is smaller than or equal to a predetermined critical angle and the electronic device is determined to be flipped; and displaying a first execution screen of the second application on the second display.

In accordance with still another aspect of the present disclosure, an electronic device is provided. The electronic device may include: a first body part; a second body part hinge-coupled to the first body part such that one side thereof is capable of coming in contact with one side of the first body part; a first display disposed on a different side of the first body part and facing a first direction; a second display disposed on a different side of the second body part and facing a second direction; and a processor configured to display an execution screen of a first application on the first display, receive a user input through the second display when an angle between the first and second body parts is smaller than or equal to a predetermined critical angle, and display, on a second area of the first display, a screen displayed on a first area of the second display corresponding to the received user input.

In accordance with yet another aspect of the present disclosure, provided is an operating method of an electronic device, which includes: a first body part; a second body part hinge-coupled to the first body part such that one side thereof is capable of coming in contact with one side of the first body part; a first display disposed on a different side of the first body part and facing a first direction; and a second display disposed on a different side of the second body part and facing a second direction, the operating method including: displaying an execution screen of a first application on the first display; receiving a user input through the second display when an angle between the first and second body parts is smaller than or equal to a predetermined critical angle; and displaying, on a second area of the first display, a screen displayed on a first area of the second display corresponding to the received user input.

Advantageous Effects

According to various embodiments of the present disclosure, when an electronic device is flipped while displaying a first screen on a first display, the electronic device can determine a second screen to be displayed on a second display so as to meet a user's intention, on the basis of the first screen. Also, the electronic device can display, on the first display, at least a part of a screen displayed on the second display. As described above, the electronic device according to various embodiments of the present disclosure can efficiently use each of multiple displays. Further, the electronic device can provide the user with an appropriate screen according to the movement of the electronic device by the user, thereby improving the user's convenience.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
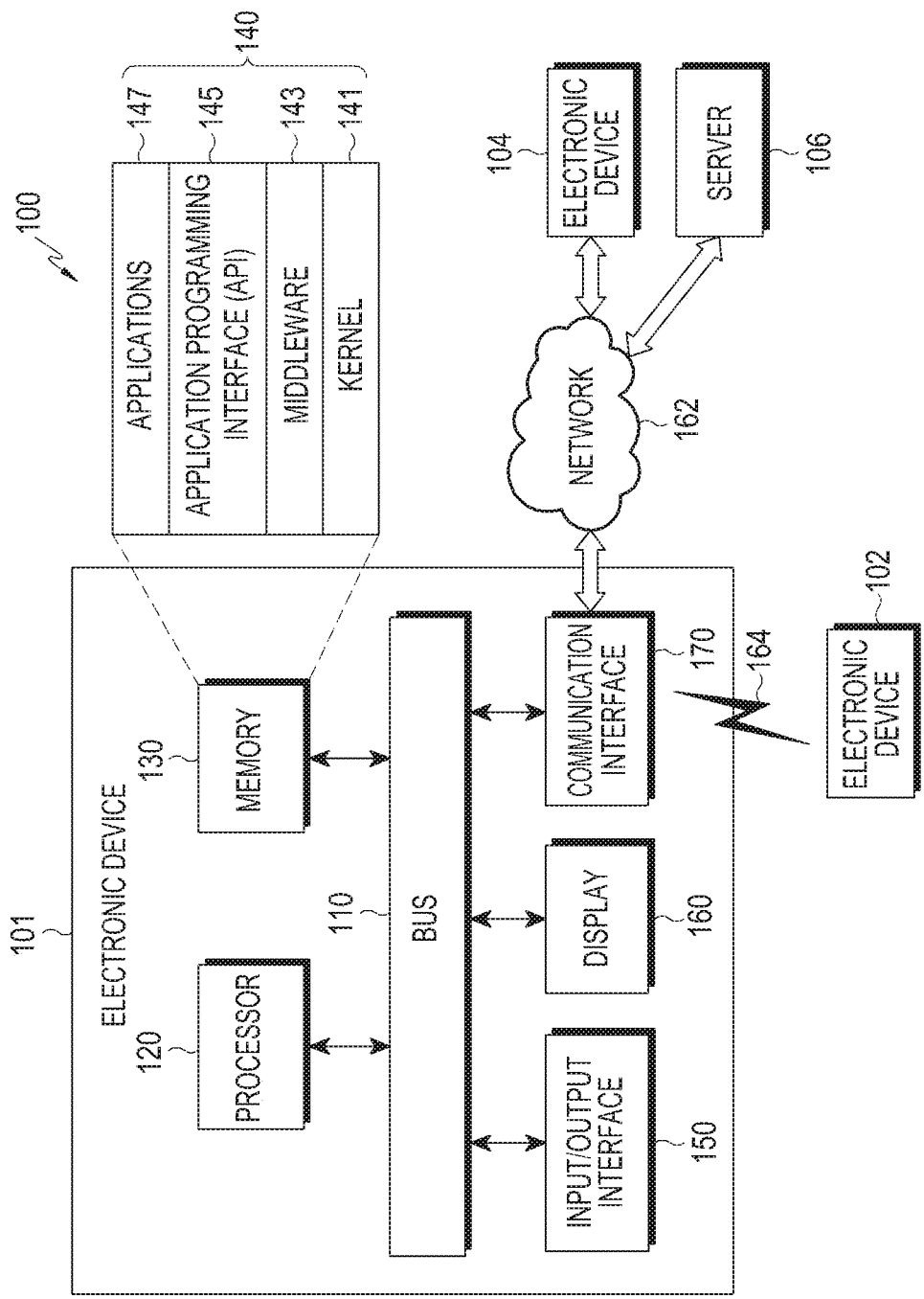
FIG. 1 illustrates a network environment including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar elements.

As used herein, the expression "have", "may have", "include", or "may include" refers to the existence of a corresponding feature (e.g., numeral, function, operation, or element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in the present disclosure may modify various elements regardless of the order and/or the importance thereof, and is used only to distinguish one element from another element, but does not limit the corresponding elements. For example, a first user device and a second user device may indicate different user devices regardless of the order or the importance thereof. For example, a first element may be termed a second element, and similarly, a second element may be termed a first element without departing from the scope of the present disclosure.

It should be understood that when an element (e.g., a first element) is referred to as being (operatively or communicatively) "connected" or "coupled" to another element (e.g., a second element), it may be directly connected or coupled directly to the other element, or any other element (e.g., a third element) may be interposed between them. In contrast, it may be understood that when an element (e.g., the first element) is referred to as being "directly connected," or "directly coupled" to another element (e.g., the second element), there is no element (e.g., the third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in context. Unless defined otherwise, all terms used herein, including technical and scientific terms, have the same meaning as those commonly understood by a person skilled in the art to which the present disclosure pertains. Such terms as those defined in a generally used dictionary may be interpreted to have meanings equal to the contextual meanings in the relevant field of the art, and are not to be interpreted to have ideal or excessively formal meanings unless clearly defined in the present disclosure. In some cases, even a term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a Television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA) device, a Magnetic Resonance Imaging (MRI) device, a Computed Tomography (CT) machine, and an ultrasonic machine), a navigation device, a Global Navigation Satellite System (GNSS), an Event Data Recorder (EDR), a Flight Data Recorder (FDR), a Vehicle Infotainment Device, electronic devices for a ship (e.g., a navigation device for a ship, and a gyro-compass), avionics devices, security devices, an automotive head unit, a robot for home or industry, an Automated Teller Machine (ATM) in banks, a Point-Of-Sales (POS) terminal in a shop, and an Internet-of-Things device (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of a piece of furniture or a building/structure, an electronic board, an electronic signature-receiving device, a projector, and various kinds of measuring instruments (e.g., a water meter, an electric meter, a gas meter, and a radio wave meter). In various embodiments, the electronic device may be a combination of one or more of the above-described various devices. According to some embodiments, the electronic device may also be a flexible device. Further, the electronic device according to an embodiment of the present disclosure is not limited to the above-described devices, and may include a new electronic device according to the development of technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

Referring to FIG. 1, a description will be made of an electronic device 101 in a network environment 100 according to various embodiments. The electronic device 101 may include a bus 110, a processor 120, a memory 130, an input/output interface 150, a display 160, and a communication interface 170. In some embodiments, at least one of the above elements of the electronic device 101 may be omitted from the electronic device 101, or the electronic device 101 may additionally include other elements.

The bus 110 may include, for example, a circuit that interconnects the elements 110 to 170 and delivers a communication (e.g., a control message and/or data) between the elements 110 to 170.

The processor 120 may include one or more of a Central Processing Unit (CPU), an Application Processor (AP), and a Communication Processor (CP). The processor 120 may perform, for example, calculations or data processing related to control over and/or communication by at least one of the other elements of the electronic device 101.

The memory 130 may include a volatile memory and/or a non-volatile memory. The memory 130 may store, for example, commands or data related to at least one of the other elements of the electronic device 101. According to an embodiment, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an "Operating System (OS)".

For example, the kernel 141 may control or manage system resources (e.g., the bus 110, the processor 120, the memory 130, and the like) used to execute operations or functions implemented by the other programs (e.g., the middleware 143, the API 145, and the application program 147). Also, the kernel 141 may provide an interface capable of controlling or managing the system resources by accessing the individual elements of the electronic device 101 by using the middleware 143, the API 145, or the application program 147.

For example, the middleware 143 may serve as an intermediary that enables the API 145 or the application program 147 to communicate with the kernel 141 and to exchange data therewith.

Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic device 101, to at least one of the application programs 147. For example, the middleware 143 may perform scheduling, load balancing, or the like of the one or more task requests by processing the one or more task requests according to the priority assigned to the at least one of the application programs 147.

The API 145 is, for example, an interface through which the application 147 controls a function provided by the kernel 141 or the middleware 143, and may include, for example, at least one interface or function (e.g., command) for file control, window control, image processing, character control, or the like.

For example, the input/output interface 150 may serve as an interface capable of delivering a command or data, which is input from a user or another external device, to element(s) other than the input/output interface 150 within the electronic device 101. Also, the input/output interface 150 may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. For example, the display 160 may display various pieces of content (e.g., text, images, videos, icons, symbols, etc.) to the user. The display 160 may include a touch screen, and may receive, for example, a touch input, a gesture input, a proximity input, or a hovering input provided by an electronic pen or a body part of the user.

The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication and may communicate with the external device (e.g., the second external electronic device 104 or the server 106).

The wireless communication may use, as a cellular communication protocol, at least one of, for example, LongTerm Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM). Also, the types of wireless communication may include wireless communication 164. The wireless communication 164 may be performed using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (GLONASS), a BeiDou Navigation Satellite System (hereinafter "BeiDou"), and a European Global Satellite-based Navigation System (Galileo), according to a use area, a bandwidth, or the like. Hereinafter, in the present disclosure, the term "GPS" may be used interchangeably with the term "GNSS". The types of wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks, such as a computer network (e.g., a Local Area Network (LAN) or a Wide Area Network (WAN)), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of operations performed by the electronic device 101 may be performed by another electronic device or multiple electronic devices (e.g., the first and second external electronic devices 102 and 104 or the server 106). According to an embodiment, when the electronic device 101 needs to perform some functions or services automatically or by a request, the electronic device 101 may send, to another device (e.g., the first external electronic device 102, the second external electronic device 104, or the server 106), a request for performing at least some functions related to the functions or services, instead of performing the functions or services by itself, or additionally. Another electronic device (e.g., the first external electronic device 102, the second external electronic device 104, or the server 106) may execute the requested functions or the additional functions, and may deliver a result of the execution thereof to the electronic device 101. The electronic device 101 may process the received result without any change or additionally and may provide the requested functions or services. To this end, use may be made of, for example, cloud computing technology, distributed computing technology, or clientserver computing technology.

The processor 120 may process at least a part of information acquired from other elements (e.g., at least one of the memory 130, the input/output interface 150, and the communication interface 170), and may use the same in various methods. For example, the processor 120 may control at least some functions of the electronic device 101 such that the electronic device 101 interworks with another electronic device (e.g., the electronic device 102 or 104 or the server 106). The processor 120 may be integrated in the communication interface 170. According to an embodiment, at least one configuration of the processor 120 may be included in the server 106, and may receive, from the server 106, the support of at least one operation implemented in the processor 120.

According to an embodiment, the memory 130 may include instructions which cause the processor 120 to operate. For example, the memory 130 may include instructions which cause the processor 120 to control the other elements of the electronic device 101 and interwork with said another electronic device 102 or 104 or the server 106. The processor 120 may control the other elements of the electronic device 101 and may interwork with said another electronic device 102 or 104 or the server 106, on the basis of the instructions stored in the memory 130. Hereinafter, when the respective elements of the electronic device 101 are considered as main agents, an operation of the electronic device 101 will be described. Also, the memory 130 may include instructions which cause the elements to perform respective operations.

According to various embodiments of the present disclosure, the electronic device 101 may include a first body part, a second body part, a first display disposed at the first body part, a second display disposed at the second body part, and a sensor that acquires direction information of the electronic device 101.

In an embodiment, one side of the second body part may be hinge-coupled to the first body part such that the one side thereof can come in contact with one side of the first body part, the first display may be disposed on the other side of the first body part, and the second display may be disposed on the other side of the second body part. The first display may be disposed on the other side of the first body part and thus may face a first direction which is a direction that the other side of the first body part faces, and the second display may be disposed on the other side of the second body part and thus may face a second direction which is the direction that the other side of the second body part faces.

Hereinafter, a description will be made focusing on the above-described structure of the first body part, the second body part, the first display, and the second display, but the present disclosure is not limited thereto. A structure of a first body part, a second body part, a first display, and a second display according to various embodiments will be described below.

According to various embodiments of the present disclosure, the processor 120 may display a screen of a first application on the first display. The processor 120 may display, on the first display, a screen of an application being executed.

According to various embodiments of the present disclosure, the processor 120 may acquire direction information of the electronic device 101 through a sensor included in the electronic device 101. For example, the processor 120 may acquire direction information of the electronic device 101 through a gyro sensor or the like included in the electronic device 101.

The processor 120 may determine whether the electronic device 101 is flipped, according to the acquired direction information. A state in which the electronic device 101 is flipped may represent a state in which the same is turned over. The processor 120 may determine whether the electronic device 101 is flipped, using the direction information.

According to various embodiments of the present disclosure, in a state in which the first body part comes in contact with the second body part, the processor 120 may detect a direction change of the electronic device on the basis of the direction information. When a direction change of the electronic device 101 is detected, the processor 120 may determine a third direction that, due to the direction change of the electronic device 101, is changed from the first direction and the first display faces. Hereinafter, a description will be made focusing on a direction that the first display faces, but the present disclosure is not limited thereto. Therefore, the description may be made using a direction that the second display faces.

The processor 120 may determine a third direction that, due to the direction change of the electronic device, is changed from the first direction and the first display faces. The processor 120 may determine an angle between the first direction and the third direction on the basis of a result of the determination. When the angle between the first direction and the third direction is larger than or equal to a predetermined critical value, the processor 120 may determine that the electronic device is flipped.

The critical value may be set based on the magnitude of an angle for determination of whether the electronic device 101 is flipped. For example, when the electronic device 101 is assumed to be completely flipped in a case where the angle between the first direction and the third direction is 180 degrees in a state in which one side of the first body part comes in contact with one side of the second body part, the critical value may be set to an angle approximating 180 degrees, for example, an angle ranging between 160 and 180 degrees.

Also, the critical value may be set according to the current state between the first and second body parts, for example, the angle therebetween.

According to various embodiments of the present disclosure, since the electronic device is determined to be flipped when an angle between the first and second body parts is smaller than or equal to a predetermined critical angle, the processor 120 may determine a second application of which an execution screen is to be displayed on the second display among multiple applications stored in the electronic device.

When one side of the first body part comes in contact with one side of the second body part, an angle between the first and second body parts is considered to be 0 degrees.

The predetermined critical angle may be set in a range in which a user who views a screen of a first application displayed on the first display cannot view a screen displayed on the second display. In the present example, the predetermined critical angle may be set in the range of 0 to 90 degrees.

Alternatively, the predetermined critical angle may be set in a range in which the user who views a screen of the first application displayed on the first display cannot view the entire screen displayed on the second display. For example, the predetermined critical angle may be set in a range in which the user can view only at least one area of a screen displayed on the second display. In the present example, the predetermined critical angle may be set in a range from 0 degrees to an angle smaller than 180 degrees.

According to various embodiments of the present disclosure, in order to determine the second application, the processor 120 may check whether a notification message has been received. When an event related to each of multiple applications included in the electronic device 101 occurs, the notification message may be a message for notifying the user of the occurrence of the event. Examples of the notification message may include messages, which notify of occurrences of respective events in multiple applications, such as Short Message Service (SMS) message reception, email reception, instant-message reception notification, add-friend notification through an instant messenger application, Social Network Service (SNS) posting update status notification, and coupon provision notification.

When the notification message is received, the processor 120 may determine, as the second application, an application related to the received notification message. For example, when an SMS message is received, the processor 120 may determine an SMS message application as the second application. Alternatively, when an email is received, the processor 120 may determine an email application as the second application.

According to various embodiments of the present disclosure, when a notification message is not received, the processor 120 may check whether a third application related to the first application has been executed. The third application may be configured to be related to the first application, and may be used in such a manner as to be paired with the first application.

The processor 120 may configure the first and third applications so as to be automatically related to each other, on the basis of an application use history of the user. For example, when the user is recorded in a user history such that the user most frequently uses a web browser application while using a messenger application, the processor 120 may establish a relationship between the messenger application and the web browser application.

Also, the processor 120 may configure the first and third applications so as to be related to each other, according to the user's configuration. For example, while the user uses a game application, in order to view a moving image related to the game application, the processor 120 enables the user to configure the moving-image reproduction application so as to be related to the game application.

Also, the processor 120 may configure the first and third applications so as to be related to each other, according to the characteristics of the first application. For example, the processor 120 may configure an email application and a document preparation application so as to be related to each other, so that, when a received email includes an attached document, the processor 120 may immediately display the attached document through the document preparation application being executed or may execute the document preparation application in order to display the attached document, thereby enabling the user to easily check the attached document included in the email.

When the third application configured to be related to the first application is being executed, the processor 120 may determine the third application as a second application of which an execution screen is to be displayed on the second display. In contrast, when the third application is not being executed, the processor 120 may display, on the second display, a message for checking whether the third application is executed.

When the processor 120 displays the message and then receives, from the user, an input for executing the third application, the processor 120 may execute the third application, and may determine the third application as the second application.

According to various embodiments of the present disclosure, when the third application is not being executed, the processor 120 may check whether there exists a fourth application which is configured such that an execution screen thereof is displayed on the second display. Also, when the processor 120 fails to receive, from the user, an input for executing the third application, the processor 120 may check whether the fourth application exists.

The fourth application may be configured by the user such that an execution screen thereof is displayed on the second display. The processor 120 enables the user to configure an application, which is frequently used through the second display, as the fourth application, so that, when it is determined that the user stares at the second display, without receiving a separate execution input, the processor 120 may display an execution screen of the fourth application on the second display.

When the fourth application exists, the processor 120 may determine the fourth application as the second application.

According to various embodiments of the present disclosure, when the fourth application does not exist, the processor 120 may determine, as the second application, one of at least one application being executed among multiple applications included in the electronic device 101.

The processor 120 may select any one application among the at least one application being executed or may select one application according to a user input, and may determine the selected application as the second application.

As described above, the processor 120 may determine a second application of which an execution screen is to be displayed on the second display, and may display, on the second display, a first execution screen of the determined second application.

However, the above-described method for determining a second application is described only by way of example, and thus the present disclosure is not limited thereto. As described above, the description has been made in the order in which the processor 120 preferentially checks a notification message, checks whether the third application is executed, checks whether the fourth application exists, and then checks the application being executed, but the present disclosure is not limited thereto.

For example, the processor 120 may determine the third application as the second application regardless of whether a notification message has been received, or may determine the fourth application as the second application regardless of whether a notification message has been received and whether the third application is executed. In other words, the elements of the method for determining a second application may be independently performed, and the application order of the elements of the method for determining a second application may be changed according to the user's configuration or the like.

According to various embodiments of the present disclosure, when an application being executed does not exist among multiple applications, the processor 120 may display a home screen on the second display. For example, when the processor 120 fails to determine a second application of which an execution screen is to be displayed on the second display through the above-described elements of the method for determining a second application, the processor 120 may display the home screen on the second display.

According to various embodiments of the present disclosure, when an angle between the first and second body parts is smaller than or equal to a predetermined critical angle and the processor 120 receives a predetermined input from the user through the input interface, the processor 120 may determine that the electronic device is flipped, and thus may display, on the second display, the first application, first content being executed by the first application, or information related to information acquired by the electronic device.

The predetermined input may include at least one of an input for touching at least one of the first and second displays, a voice input corresponding to a predetermined voice, a gesture input corresponding to a predetermined gesture pattern, an input entered through the motion of the electronic device corresponding to a predetermined pattern, and an input entered through a function key of the electronic device. However, examples of the predetermined input are not limited thereto, and thus all inputs, which can be received through the input/output interface 150 included in the electronic device 101, may be used as additional inputs.

The user or a provider of the first application or the first content may configure the related information so as to be related to the first application or the first content. Examples of the related information may include an image which is representative of the first application or the first content, recommendation information for another application related thereto, information representing the review thereof, information representing an execution screen thereof, advertisement information related thereto, and the like.

According to various embodiments of the present disclosure, the processor 120 may determine whether an angle between the first and second body parts exceeds a predetermined critical angle.

As described above, the predetermined critical angle may be set in a range in which a user who views a screen of a first application displayed on the first display cannot view a screen displayed on the second display. In the present example, the predetermined critical angle may be set in the range of 0 to 90 degrees. Accordingly, when an angle between the first and second body parts exceeds the predetermined critical angle, the user may view all screens respectively displayed on the first and second displays.

According to various embodiments of the present disclosure, when an angle between the first and second body parts exceeds the predetermined critical angle, the processor 120 may determine a fifth application of which an execution screen is to be displayed on the first display among multiple applications.

After the electronic device 101 is flipped, the user may view only a screen displayed on the second display. However, when an angle between the first and second body parts exceeds the predetermined critical angle, the user may view both of the first and second displays, and thus the processor 120 needs to determine the fifth application.

Alternatively, without determining the fifth application, the processor 120 may display a first execution screen of the second application, which is displayed on the second display, throughout the first and second displays.

The processor 120 may display an execution screen of the determined fifth application on the first display.

According to various embodiments of the present disclosure, the processor 120 may determine, as the fifth application, a sixth application related to a second application of which an execution screen is displayed on the second display, or a seventh application selected by the user. The sixth application related to the second application has the same relationship as the above-described relationship of the third application related to the first application, and thus a separate description will be omitted.

Also, when the fifth application is determined as the second application, the processor 120 may display a second execution screen of the second application on the first display. Further, as described above, the processor 120 may display a first execution screen of the first application, which is displayed on the second display, throughout the first and second displays.

According to various embodiments of the present disclosure, when an angle between the first and second body parts is smaller than or equal to a predetermined critical angle, the processor 120 may receive a user input through the second display. As described above, when an angle between the first and second body parts is smaller than or equal to the predetermined critical angle and a user is currently staring at the first display, the user may not view a screen of the second display.

The processor 120 may display a screen, which is displayed on a first area of the second display corresponding to the user input received through the second display, on a second area of the first display. For example, when the user input is a touch-and-drag input, the first area may be determined based on a point at which the touch input has been received and a point at which the drag input is received. Alternatively, when the user is maintaining a drag input, the size and position of the first area may be changed in real time according to the drag input. As described above, the position and size of the first area may be variably determined according to the user input.

The second area of the first display may have a position and a size identical to those of the first area of the second display, or may be different from those of the first area of the second display according to the user's configuration or the like.

According to various embodiments of the present disclosure, while the user input is maintained, the processor 120 may display a screen, which is displayed on the first area of the second display, on the second area of the first display. Accordingly, when the user input is terminated, the processor 120 may no longer display a screen, which is displayed on the first area of the second display, on the second area of the first display.

Alternatively, regardless of whether the user input is maintained, before the processor 120 receives a separate user input for terminating the display of the first area of the second display, the processor 120 may display a screen, which is displayed on the first area of the second display, on the second area of the first display.

Figure 2:
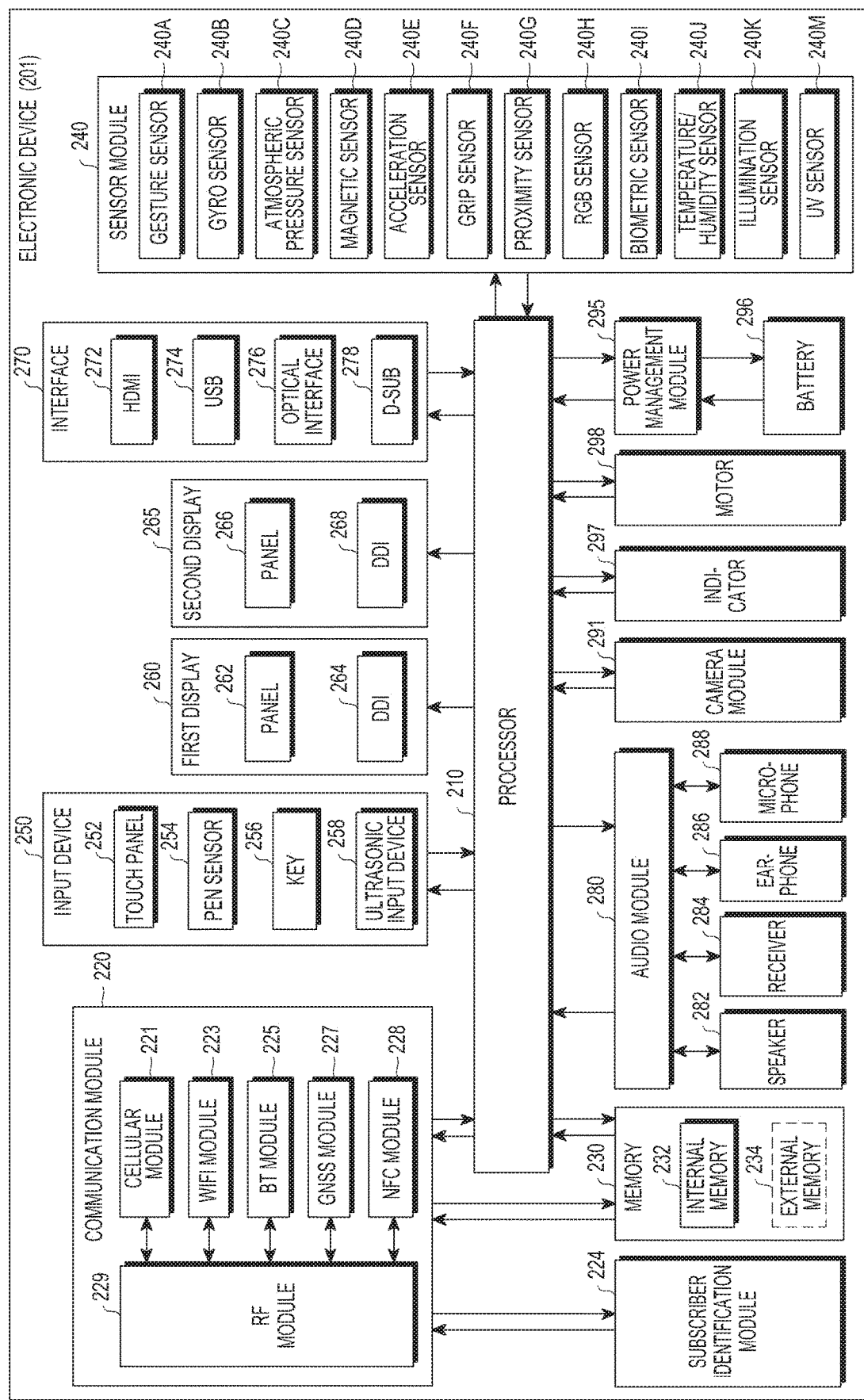
FIG. 2 is a block diagram illustrating an electronic device according to various embodiments of the present disclosure.

FIG. 2 is a block diagram illustrating an electronic device 201 according to various embodiments of the present disclosure. For example, the electronic device 201 may include the whole or part of the electronic device 101 illustrated in FIG. 1. The electronic device 201 may include at least one processor (e.g., an AP) 210, a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298. The processor 210 may control multiple hardware or software elements connected to the processor 210 by running, for example, an OS or an application program, and may perform the processing of, and arithmetic operations on, various data. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store resulting data in a non-volatile memory.

The communication module 220 may have a configuration identical or similar to that of, for example, the communication interface 170. The communication module 220 may include, for example, the cellular module 221, a Wi-Fi module 223, a Bluetooth (BT) module 225, a GNSS module 227, an NFC module 228, and a Radio Frequency (RF) module 229. For example, the cellular module 221 may provide a voice call, a video call, a text message service, an Internet service, and the like through a communication network. According to an embodiment, the cellular module 221 may identify or authenticate an electronic device 201 in the communication network by using the subscriber identification module (e.g., a Subscriber Identity Module (SIM) card) 224. According to an embodiment, the cellular module 221 may perform at least some of the functions that the processor 210 may provide. According to an embodiment, the cellular module 221 may include a CP. According to some embodiments, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit and receive, for example, communication signals (e.g., RF signals). The RF module 229 may include, for example, a transceiver, a Power Amplifier Module (PAM), a frequency filter, a Low-Noise Amplifier (LNA), and an antenna. According to another embodiment, at least one of the cellular module 221, the Wi-Fi module 223, the BT module 225, the GNSS module 227, and the NFC module 228 may transmit and receive RF signals through a separate RF module. The subscriber identification module 224 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, and a Solid-State Drive (SSD)). The external memory 234 may include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red-Green-Blue (RGB) sensor), a biometric sensor 240I, a temperature/humidity sensor 240J, an illuminance sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input apparatus 250 may include, for example, a touch panel 252, a (digital) pen sensor 254, a key 256, or an ultrasonic input unit 258. The touch panel 252 may use at least one of, for example, a capacitive scheme, a resistive scheme, an infrared scheme, and an acoustic wave scheme. Also, the touch panel 252 may further include a control circuit. The touch panel 252 may further include a tactile layer and may provide a tactile reaction to the user. The (digital) pen sensor 254 may include, for example, a recognition sheet which is a part of the touch panel or is separated from the touch panel. The key 256 may be, for example, a physical button, an optical key, and a keypad. The ultrasonic input unit 258 may sense an ultrasonic wave generated by an input means through a microphone (e.g., a microphone 288), and may confirm data corresponding to the sensed ultrasonic wave.

In an embodiment, a display (e.g., the display 160) may include a first display 260 and a second display 265. The first display may include a first panel 262 and a first display driving circuit (Display Driver IC (DDI)) 264 configured to control the first panel. The first panel 262 may have multiple pixels, and each pixel may include multiple subordinate pixels (sub-pixels) displaying Red, Green, and Blue (RGB) which are the three primary colors of light. Each of the sub-pixels may include at least one transistor, and may adjust a pixel and may express a color according to the magnitude of a voltage applied across (or a current flowing through) the transistor. The first display driving circuit 264 may include a gate driver circuit unit that controls gates of sub-pixels RGB by using an on/off function, and a source driver circuit unit that generates a color difference by adjusting image signals of the sub-pixels RGB, and may provide an entire screen while adjusting transistors of sub-pixels of the first panel 262. The first display driving circuit may operate such that the same receives first image data from the processor 210 and displays a video or an image on the first panel.

The second display may include a second panel 266 and a second display driving circuit (Display Driver IC (DDI)) 268 configured to control the second panel. The second panel 266 may have multiple pixels, and each pixel may include multiple subordinate pixels (sub-pixels) displaying Red, Green, and Blue (RGB) which are the three primary colors of light. Each of the sub-pixels may include at least one transistor, and may adjust a pixel and may express a color according to the magnitude of a voltage applied across (or a current flowing through) the transistor. The second display driving circuit 268 may include a gate driver circuit unit that controls gates of sub-pixels RGB by using an on/off function, and a source driver circuit unit that generates a color difference by adjusting image signals of the sub-pixels RGB, and may configure an entire screen while adjusting transistors of sub-pixels of the second panel 266. The second display driving circuit may operate such that the same receives second image data identical to or different from the first image data from the processor 210 and displays a video or an image on the second panel.

In various embodiments, at least one of the first and second panels 262 and 266 may be implemented to be, for example, flat, flexible, or bendable. At least one of the first and second panels 262 and 266 may include one or more modules that include the touch panel 252 and/or the pen sensor 254.

The first and second displays 260 and 265 (e.g., the display 160) may include other image output schemes (a hologram unit, a projector, etc. (not illustrated)) and/or a control circuit that controls the same.

In embodiments in which an apparatus including multiple displays is implemented, at least some of multiple modules of a terminal and contents (e.g., image data, an image data stream, etc.), which are changed in the apparatus, may be processed using the processor 210. The processor may determine that the changed contents are to be displayed on at least one display among the first and second displays 260 and 265. For example, the processor enables the first display 260 to output a command received from the communication module 220, and enables the second display 265 to output a command received from the sensor module 240. In another embodiment, the processor may allow contents output on the first display 260 to be switched and extended to the second display 265 so as to be displayed on a screen thereof, or may allow contents output on the second display 265 to be switched and extended to the first display 260 so as to be displayed on a screen thereof.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 145 illustrated in FIG. 1. The audio module 280 may process sound information which is input or output through, for example, a speaker 282, a receiver 284, an earphone 286, the microphone 288, or the like. The camera module 291 is, for example, a device capable of capturing a still image and a moving image. According to an embodiment, the camera module 291 may include one or more image sensors (e.g., a front sensor or a back sensor), a lens, an Image Signal Processor (ISP), and a flash (e.g., an LED, a xenon lamp, or the like). The power management module 295 may manage, for example, power of the electronic device 201. According to an embodiment, the power management module 295 may include a Power Management Integrated Circuit (PMIC), a charger IC, or a battery fuel gauge. The PMIC may use a wired and/or wireless charging method. Examples of the wireless charging method may include a magnetic resonance method, a magnetic induction method, an electromagnetic method, and the like. The power management module 295 may further include additional circuits (e.g., a coil loop, a resonance circuit, a rectifier, etc.) for wireless charging. The battery fuel gauge may measure, for example, a residual quantity of the battery 296, and a voltage, a current, or a temperature during the charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include, for example, a mobile TV support apparatus (e.g., a GPU) capable of processing media data according to a standard, such as Digital Multimedia Broadcasting (DMB), Digital Video Broadcasting (DVB), or mediaFLO™. Each of the above-described elements according to the present disclosure may be configured with one or more components, and the names of the corresponding elements may vary based on the type of electronic device. In various embodiments, some elements of the electronic device (e.g., the electronic device 201) may be omitted therefrom or the electronic device may further include additional elements, or some elements of the electronic device may be combined into one entity, which may perform functions identical to those of the relevant elements before the combination thereof.

Figure 3:
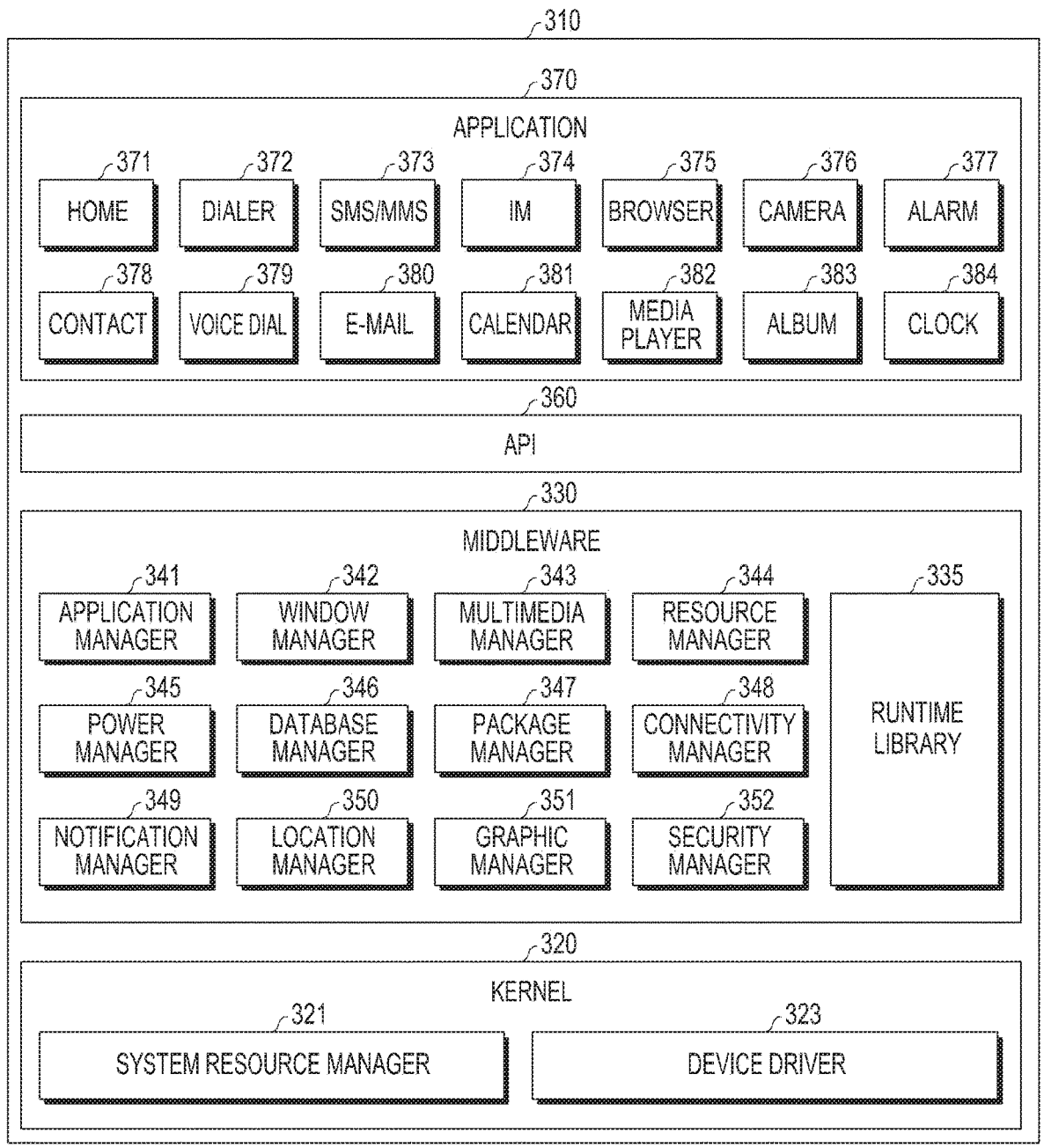
FIG. 3 is a block diagram illustrating a program module according to various embodiments of the present disclosure.

FIG. 3 is a block diagram illustrating a program module according to various embodiments. According to an embodiment, the program module 310 (e.g., the program 140) may include an OS for controlling resources related to the electronic device (e.g., the electronic device 101) and/or various applications (e.g., the application programs 147) executed in the OS. The OS may be, for example, Android, iOS, Windows, Symbian, Tizen, Bada, and the like.

The program module 310 may include a kernel 320, middleware 330, an API 360, and/or an application 370. At least some of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add a new function by using a programming language during the execution of the application 370. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine formats required to reproduce various media files, and may encode or decode a media file by using a coder/decoder (codec) appropriate for the relevant format. The resource manager 344 may manage resources, such as a source code of at least one of the applications 370, a memory or storage space for the at least one of the applications 370, and the like.

For example, the power manager 345 may operate together with a Basic Input/Output System (BIOS), etc. and may manage a battery or power, and may provide power information and the like required for an operation of the electronic device. The database manager 346 may generate, search, or change a database to be used by at least one of the applications 370. The package manager 347 may manage the installation or update of an application distributed in the form of a package file.

The connectivity manager 348 may manage a wireless connection, such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform, and in the case of Tizen, two or more API sets may be provided for each platform.

The application 370 (e.g., the application program 147) may include one or more applications capable of performing functions, such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a clock 384, health care (e.g., which measures an exercise quantity, a blood sugar level, or the like), and provision of environmental information (e.g., information on atmospheric pressure, humidity, temperature, or the like).

According to an embodiment, the application 370 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for delivering particular information to an external electronic device or a device management application for managing an external electronic device.

For example, the notification relay application may include a function of delivering, to the external electronic device (e.g., the electronic device 102 or 104), notification information generated by the other applications (e.g., the SMS/MMS application, the email application, the health care application, the environmental information application, etc.) of the electronic device 101. Also, for example, the notification relay application may receive notification information from the external electronic device and may provide the received notification information to the user.

The device management application may manage (e.g., install, delete, or update), for example, at least one function (e.g., turning on/off the external electronic device itself (or some elements thereof) or adjusting the brightness (or resolution) of the display) of the external electronic device (e.g., the electronic device 102 or 104) communicating with the electronic device, an application executed in the external electronic device, or a service (e.g., a telephone call service, a message service, or the like) provided by the electronic device.

According to an embodiment, the application 370 may include an application (e.g., a health care application of a mobile medical device or the like) designated according to an attribute of the external electronic device (e.g., the electronic device 102 or 104). According to an embodiment, the application 370 may include an application received from the external electronic device (e.g., the server 106, or the electronic device 102 or 104). According to an embodiment, the application 370 may include a preloaded application or a third-party application which can be downloaded from the server. The names of the elements of the program module 310, according to the embodiment illustrated in FIG. 3, may vary according to the type of OS.

According to various embodiments, at least part of the program module 310 may be implemented in software, firmware, hardware, or a combination of two or more thereof. At least part of the program module 310 may be implemented (for example, executed) by, for example, the processor (e.g., the processor 210). At least part of the program module 310 may include, for example, a module, a program, a routine, a set of instructions, or a process for performing one or more functions.

Figure 4A:
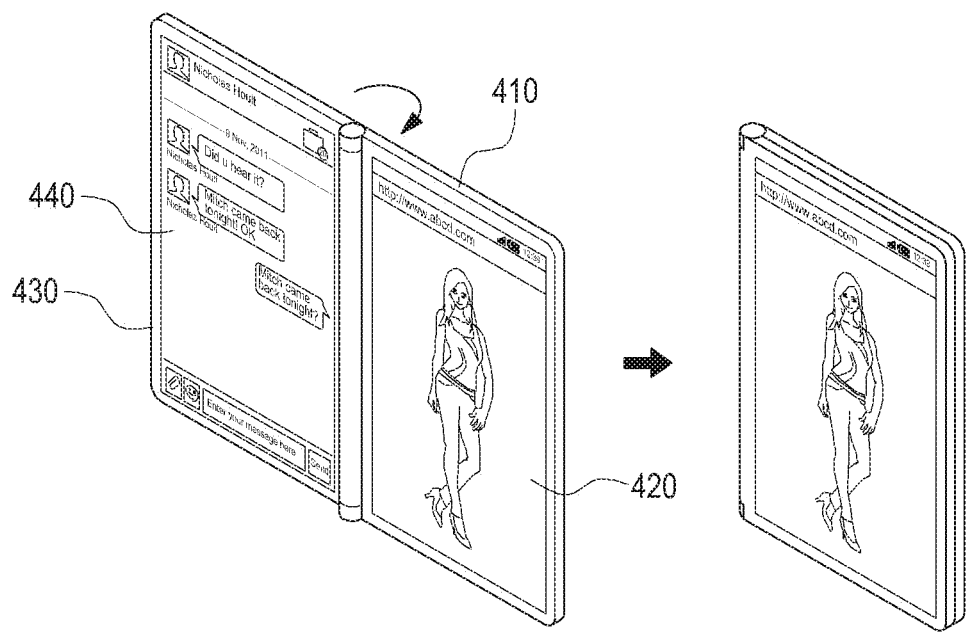
FIGS. 4A and 4B each illustrate an electronic device according to various embodiments of the present disclosure.
Figure 4B:
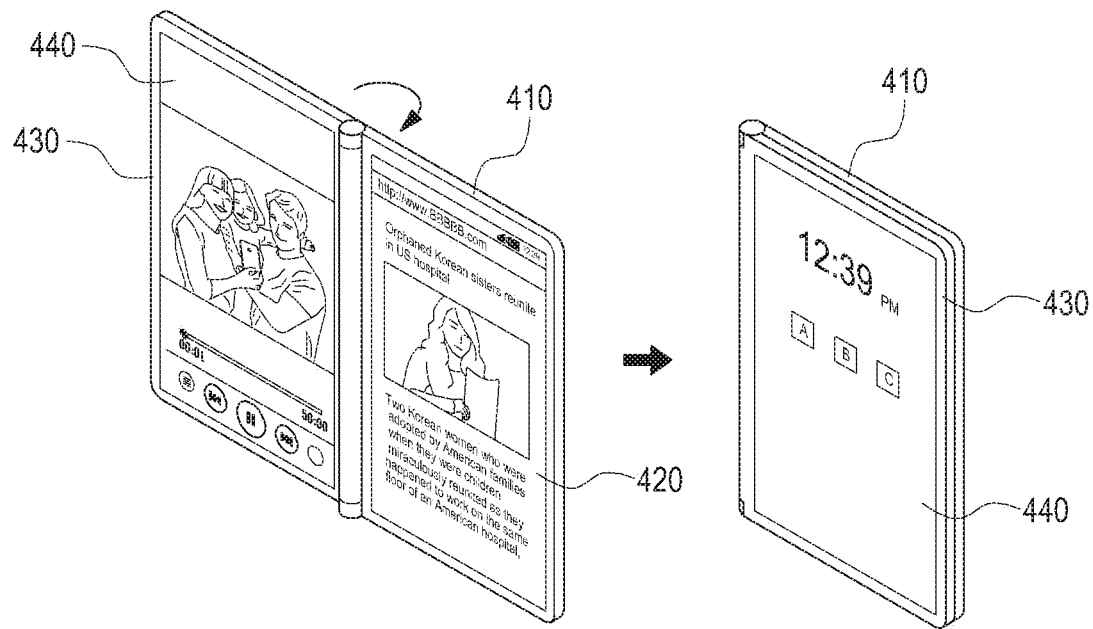

FIGS. 4A and 4B each illustrate an electronic device according to various embodiments of the present disclosure.

According to various embodiments of the present disclosure, the electronic device 101 may include a first body part 410 and a second body part 430. The first and second body parts 410 and 430 may be rotatably coupled to each other. Referring to FIG. 4A, the first body part 410 may be hinge-coupled to the second body part 430 such that one side of the first body part 410 can come in contact with one side of the second body part 430. The first body part 410 may be coupled to the second body part 430 through a hinge member.

Alternatively, the first and second body parts 410 and 420 may be configured as a single body part without a separate coupling member, and the single body part may be configured such that the first and second body parts 410 and 420 are rotatable.

Referring to FIG. 4A, a first display 420 may be disposed on the other side of the first body part 410, and a second display 440 may be disposed on the other side of the second body part 430. Alternatively, the first body part 410 may have a display disposed on each of one and the other sides thereof, and the second body part 430 may also have a display disposed on each of one and the other sides thereof.

In an embodiment, in a state in which the first and second body parts 410 and 430 are unfolded, a processor (e.g., the processor 120) of the electronic device 101 may display an execution screen of a first application on the first display 420 disposed at the first body part 410. The state where the first and second body parts 410 and 430 are unfolded may represent a state where, without requiring a user to move the electronic device 101, the user can simultaneously view the first display 420 disposed at the first body part 410 and the second display 440 disposed at the second body part 430.

For example, the state where the first and second body parts 410 and 430 are unfolded may be a state where the user can simultaneously view the first and second displays 420 and 440, as in a case where an angle between the first and second body parts 410 and 430 is 180 degrees or is smaller than or equal to an angle predetermined with reference to 180 degrees.

For example, the first application may be a web browser application, and a screen of a particular web site accessed through a web application may be displayed on the first display 420.

Also, in the state where the first and second body parts 410 and 430 are unfolded, the processor may display an execution screen of a second application or that of the first application on the second display 440 disposed at the second body part 430. Further, the processor may display an execution screen of the first application throughout the first and second displays 420 and 440, or may respectively display execution screens of the first and second applications on the first and second displays 420 and 440.

In an embodiment, when at least one of the first and second body parts 410 and 430 rotates and one side of the first body part 410 comes in contact with that of the second body part 430, each of a direction that the first display 420 disposed on the other side of the first body part 410 faces and a direction that the second display 440 disposed on the other side of the second body part 430 faces may be a direction toward the outside of the electronic device 101 as illustrated in FIG. 4A.

When one side of the first body part 410 comes in contact with that of the second body part 430, a screen displayed on the first display 420 may be maintained without any change. Also, a screen displayed on the second display 440 may also be maintained without any change, or the second display 440 may be powered off so as to reduce power consumption.

In an embodiment, although not illustrated in FIG. 4A, when at least one of the first and second body parts 410 and 430 rotates and the other side of the first body part 410 comes in contact with that of the second body part 430, the direction of the first display 420 disposed on the other side of the first body part 410 is opposite to that of the second display 440 disposed on the other side of the second body part 430. In the present example, the first and second displays 420 and 440 may not be exposed to the outside.

Also, referring to FIG. 4B, when at least one of the first and second body parts 410 and 430 rotates and the other side of the first body part 410 comes in contact with that of the second body part 430, a screen, which is displayed on the first display 420 before the first body part 410 comes in contact with the second body part 430, may be changed to a predetermined screen or an execution screen of a third application. Also, in order to reduce power consumption, the predetermined screen may be displayed not on the entire area of the first display 420, but on a portion of the area thereof. By this configuration, the electronic device 101 may display the predetermined screen by using power lower than that of a case where the electronic device 101 displays a screen on the entire display area of the first display 420. Examples of the predetermined screen may include a lock screen, a home screen, a standby screen, and the like, and may include other screens configured by a user.

Also, the direction of the electronic device 101 may be determined based on direction information acquired by a sensor included in the electronic device 101, and the predetermined screen or an execution screen of the third application may be displayed on the second display 440 according to direction information obtained by the determination of the direction of the electronic device 101. For example, the electronic device 101 may determine a display at which the user stares, on the basis of the direction of the electronic device 101, and the predetermined screen or an execution screen of the third application may be displayed on the display having been determined as a display at which the user has stared.

As described above, according to whether the first body part 410 comes in contact with the second body part 430, a screen displayed on at least one of the first and second displays 420 and 440 may be maintained or changed, or whether the first and second displays 420 and 440 are operated may be determined. In contrast, even when the first body part 410 does not come in contact with the second body part 430, according to an angle between the first and second body parts 410 and 430, a screen may be changed or whether the first and second displays 420 and 440 are operated may be determined.

In an embodiment, not only in the case where the first body part 410 comes in contact with the second body part 430 but also in a case where the first body part 410 comes close to the second body part 430, for example, when an angle between the first and second body parts 410 and 430 is smaller than or equal to a predetermined angle, a screen displayed on each of the first and second displays 420 and 440 may be changed, or whether each of the first and second displays 420 and 440 is operated may be determined.

However, this configuration is described only by way of example, and thus the present disclosure is not limited thereto. A screen to be displayed on each of the first and second displays 420 and 440 may be determined, based on not only an angle between the first and second body parts 410 and 430 but also the user's configuration or an application being executed. Also, according to the user's configuration or an application being executed, whether the first and second displays 420 and 440 are operated may be changed.

Further, in an embodiment, although not illustrated, a third display may be disposed on one side of the first body part 410. In the present example, when the other side of the first body part 410 comes in contact with that of the second body part 430, a direction that the third display faces may be a direction that is toward the outside of the electronic device 101 and is opposite to a direction that the first display 410 faces.

The third display may be driven by power lower than power which drives each of the first and second displays 420 and 440. Accordingly, the third display may be configured to be always turned on before receiving a designated input (e.g., a screen lock key input), and may be configured to display designated information (e.g., the current time, a battery state, developed conditions, or various pieces of notification information (message notification, a telephone call in the absence of a user, or the like)).

In an embodiment, the third display may be controlled by a processor (e.g., the processor 120) that controls overall functions of the electronic device 101. Also, the electronic device 101 may include a separate low-power processor that operates the third display by using low power. When the electronic device 101 includes a low-power processor, a function of displaying the designated information on the third display may be performed by the low-power processor.

In an embodiment, the electronic device 101 may determine a display, which is to display the designated information among multiple displays, according to whether, when the first and second body parts 410 and 430 come in contact with each other, each of the contacting sides is one side or the other side. As described above, when the other side of the first body part 410 comes in contact with that of the second body part 430, the electronic device 101 may display the designated information on the third display. In contrast, when one side of the first body part 410 comes in contact with that of the second body part 430, the electronic device 101 may display the designated information on at least one of the first and second displays 420 and 440.

Also, the electronic device 101 may determine a display, which is to display the designated information among multiple displays, on the basis of an angle between the first and second body parts 410 and 430. For example, when one side of the first body part 410 comes in contact with that of the second body part 430, the electronic device 101 may set a corresponding angle to 0 degrees, and when an angle between the first and second body parts 410 and 430 is smaller than or equal to a predetermined angle, may display the designated information on at least one of the first and second displays 420 and 440.

Also, when an angle between the first and second body parts 410 and 430 exceeds the predetermined angle, the electronic device 101 may display the designated information on the third display.

FIGS. 5A to 5E illustrate various operation forms of an electronic device according to various embodiments of the present disclosure.

Figure 5A:
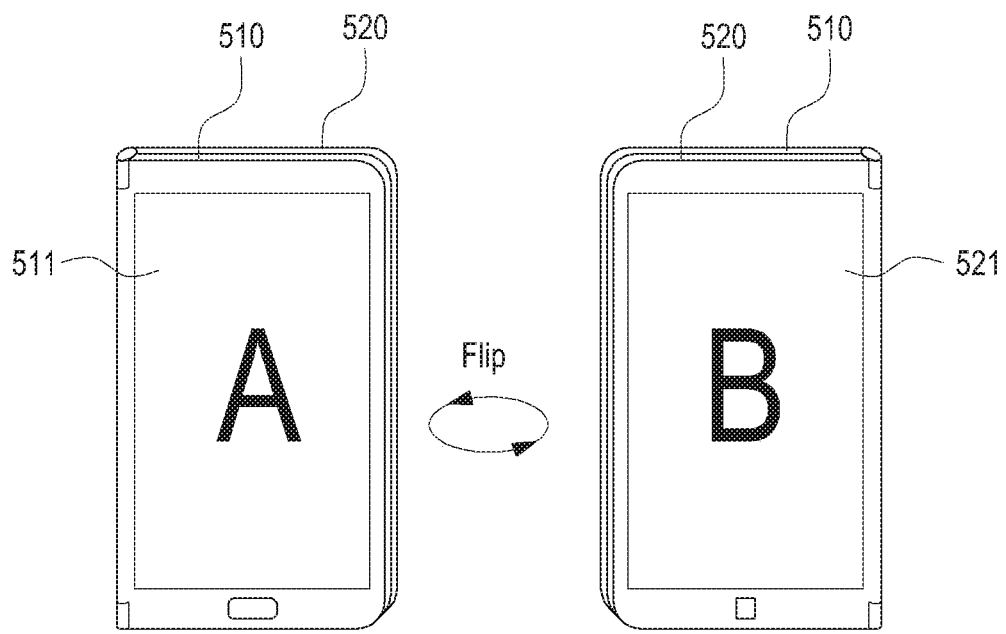
FIGS. 5A to 5E illustrate various operation forms of an electronic device according to various embodiments of the present disclosure.

As illustrated in FIG. 5A, the electronic device 101 may be flipped by a user. A state in which the electronic device 101 is flipped may represent a state in which the same is turned over. The electronic device 101 may include a sensor that acquires direction information thereof, and may determine whether the electronic device 101 is flipped, using direction information thereof acquired by the sensor.

For example, as illustrated in FIG. 5A, in a state in which a first body part 510 comes in contact with a second body part 520, the electronic device 101 may determine at least one direction among a direction that a first display 511 disposed at the first body part 510 faces, and a direction that a second display 521 disposed at the second body part 520 faces, according to direction information of the electronic device 101 acquired by the sensor thereof.

The electronic device 101 may determine whether the same is flipped, on the basis of the at least one determined direction among the direction that the first display 511 faces, and the direction that the second display 521 faces. When the at least one determined direction among the direction that the first display 511 faces and the direction that the second display 521 faces is changed to the opposite direction, the electronic device 101 may determine that the electronic device 101 is flipped.

For example, the electronic device 101: may determine an angle between the at least one determined direction among the direction that the first display 511 faces and the direction that the second display 521 faces, and the existing direction that the first display 511 faces and the existing direction that the second display 521 faces; and may determine whether the electronic device 101 is flipped, according to the determined angle.

Figure 5B:
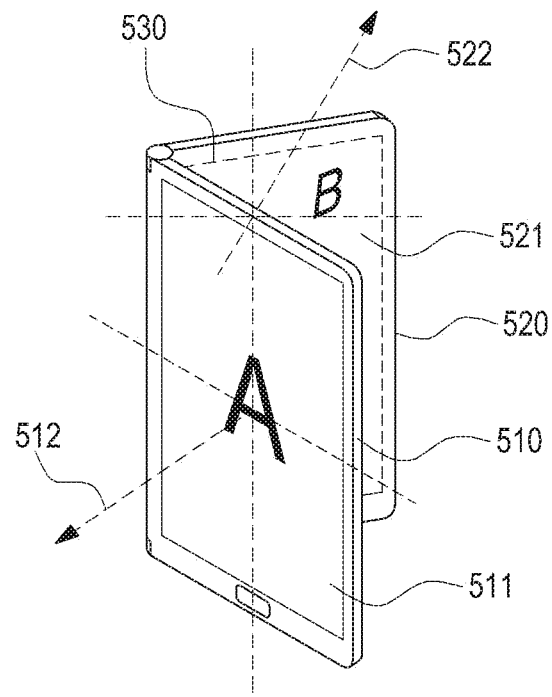

Referring to FIG. 5B, a direction 512 that the first display 511 disposed at the first body part 510 faces may be a direction perpendicular to the first display 511. Similarly, a direction 522 that the second display 521 disposed at the second body part 520 faces may be a direction perpendicular to the second display 521.

However, this configuration is described only by way of example, and thus the present disclosure is not limited thereto. In order to determine the movement of the electronic device 101, a direction that each of the first and second displays 511 and 521 faces may be configured according to various schemes.

Figure 5C:
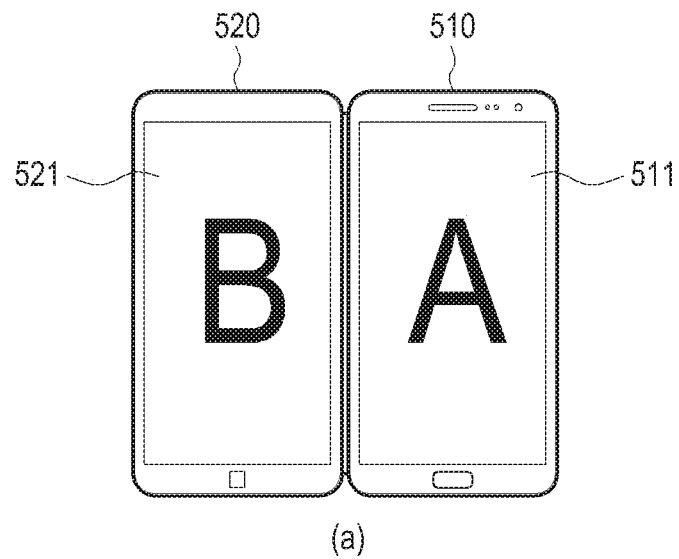
Figure 5C:
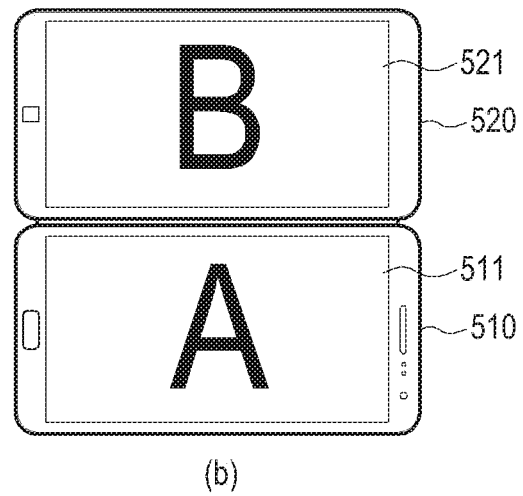
Figure 5C:
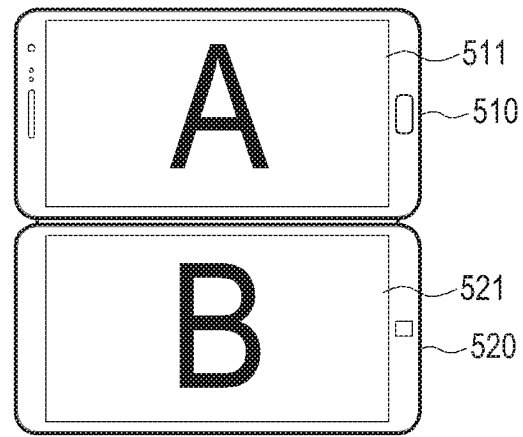

FIG. 5C illustrates the electronic device 101 in a state in which the first body part 510 and the second body part 520 are unfolded. In the state where the first and second body parts 510 and 520 are unfolded, the electronic device 101 may display an execution screen of an application A throughout the first display 511 and the second display 521, or may display an execution screen of the application A and that of an application B on each of the first display 511 and the second display 521.

As illustrated in (a), (b), and (c) of FIG. 5C, the electronic device 101 may display an execution screen of the application A or that of the application B on each of the first and second displays 511 and 512 on the basis of a direction thereof.

Figure 5D:
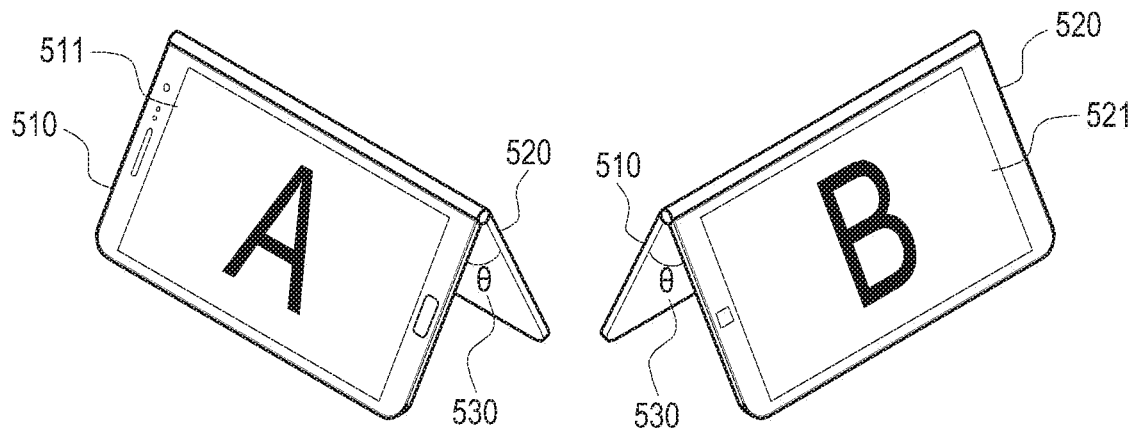
Figure 5D:
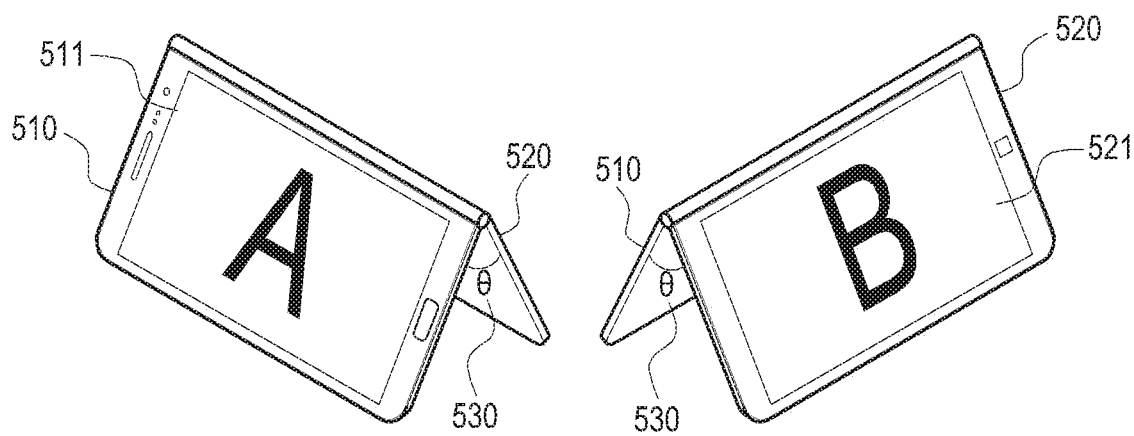

FIG. 5D illustrates a state in which the electronic device 101 stands while the angle between the first and second body parts 510 and 520 is maintained at a predetermined angle. In order to enable the electronic device 101 to stand, the angle between the first and second body parts 510 and 520 may be maintained at the predetermined angle.

In the present example, as illustrated in (a) of FIG. 5D, one display from among the first and second displays 511 and 521 may be turned off. Also, as illustrated in (b) of FIG. 5D, both of the first and second displays 511 and 521 may be turned on according to the user's configuration or an application being executed.

Figure 5E:
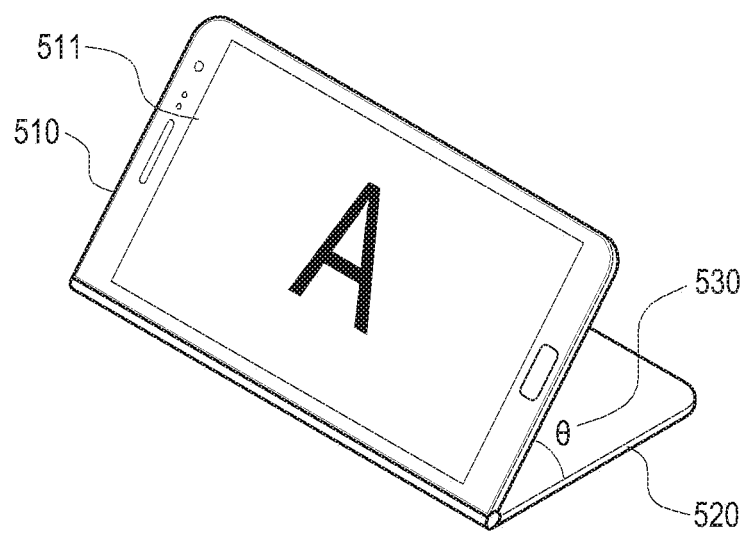
Figure 5E:
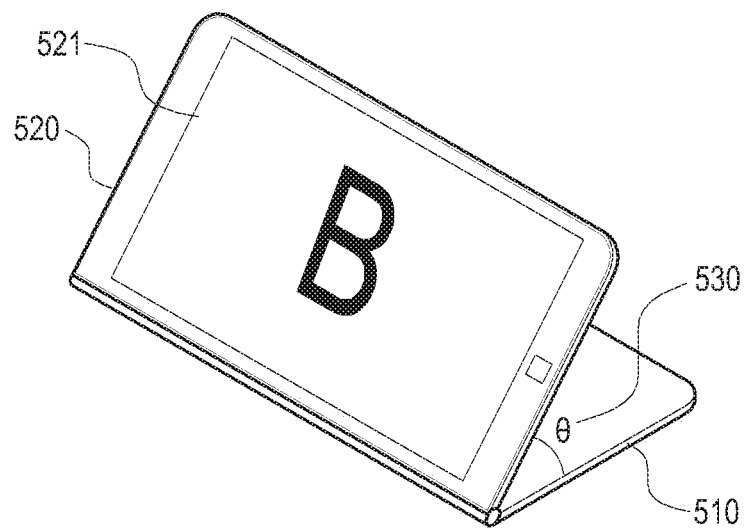

FIG. 5E illustrates the electronic device 101 in a state in which one display from among the first and second displays 511 and 521 is placed on the bottom surface. The user may allow one display from among the first and second displays 511 and 521 to be placed on the bottom surface, and may use the other display such that the other display is raised to maintain a predetermined angle or larger with the display placed on the bottom surface.

When one display is placed on the bottom surface, the electronic device 101 may recognize that the display is placed on the bottom surface, using a sensor of the display. The electronic device 101 may turn on only the other display, and may turn off the display placed on the bottom surface.

For example, as illustrated in (a) of FIG. 5E, when the second display 521 is placed on the bottom surface and the first display 511 is raised for use, the electronic device 101 may turn on only the first display 511, and may display an execution screen of the application A on the first display 511.

Similarly, as illustrated in (b) of FIG. 5E, when the first display 511 is placed on the bottom surface and the second display 521 is raised for use, the electronic device 101 may turn on only the second display 521, and may display an execution screen of the application B on the second display 521.

FIGS. 6A to 6D are views for explaining various operating modes of an electronic device according to an angle between a first body part and a second body part according to various embodiments of the present disclosure.

Figure 6A:
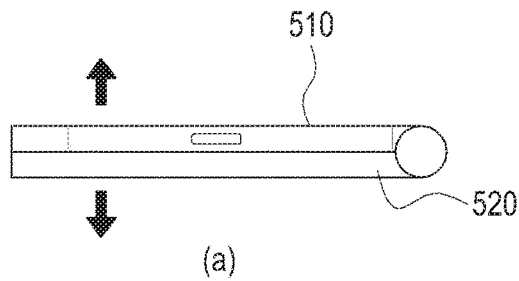
FIGS. 6A to 6D are views for explaining various operating modes of an electronic device according to an angle between a first body part and a second body part according to various embodiments of the present disclosure.
Figure 6A:
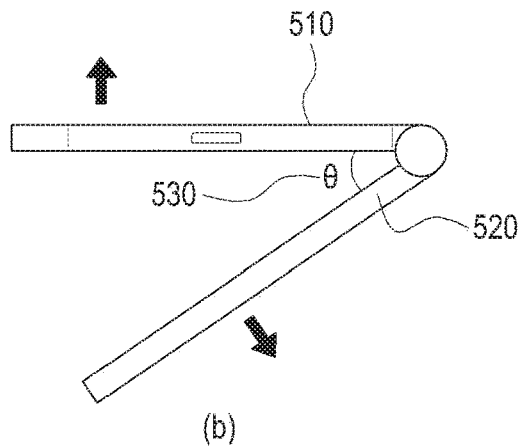

FIG. 6A illustrates the electronic device 101 that operates in a first mode when the first and second body parts 510 and 520 of the electronic device 101 come in contact with each other as illustrated in FIG. 5A or when an angle 530 between the first and second body parts 510 and 520 is smaller than or equal to a predetermined angle.

As illustrated in FIG. 6A, according to the angle 530 between the first and second body parts 510 and 520, the electronic device 101 may determine an operating mode thereof as the first mode. For example, when the angle 530 between the first and second body parts 510 and 520 ranges between 0 and 20 degrees, the electronic device 101 may operate in the first mode.

In the first mode, the electronic device 101 may turn on only one display among first and second displays 511 and 521. In this regard, when there exists a screen of an application being displayed on the second display 521, the execution of the application may not be terminated. Also, the electronic device 101 may turn on both of the first and second displays 511 and 521 according to a user's operation, the user's configuration, or an application being executed.

In addition, the electronic device 101 may determine whether the electronic device 101 is flipped, on the basis of direction information thereof, and may determine a display to be turned on, according to a result of the determination. Also, the electronic device 101 may use a display having been turned off, as an input means for backside touch.

Figure 6B:
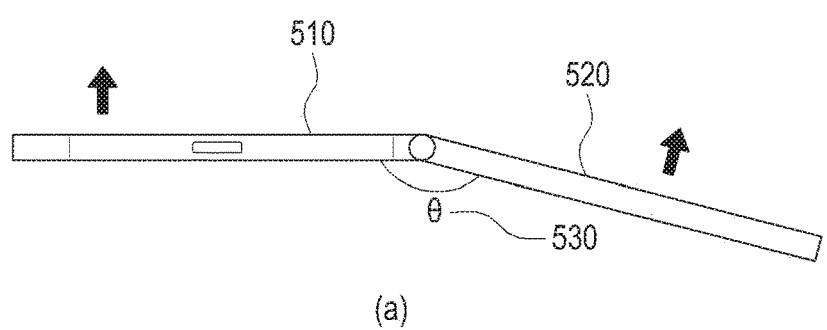
Figure 6B:
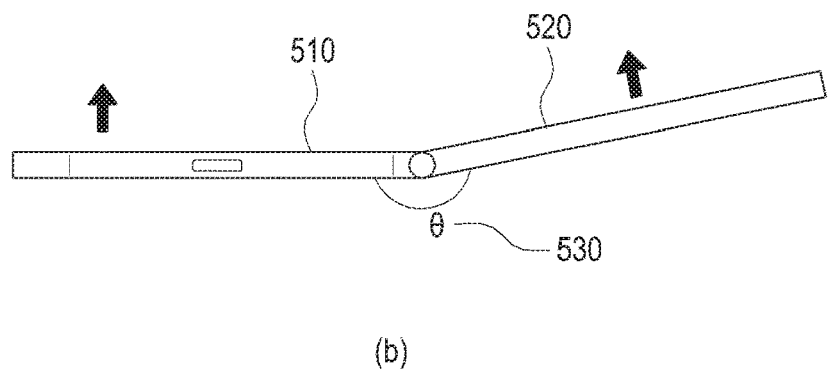

FIG. 6B illustrates the electronic device 101 that operates in a second mode when the first and second body parts 510 and 520 of the electronic device 101 are unfolded as illustrated in FIG. 5C. As illustrated in FIG. 6B, according to an angle 530 between the first and second body parts 510 and 520, the electronic device 101 may determine an operating mode thereof as the second mode. For example, when the angle 530 between the first and second body parts 510 and 520 ranges between 170 and 210 degrees, the electronic device 101 may operate in the second mode.

In the second mode, the electronic device 101 may turn on both of the first and second displays 511 and 521, and may display an execution screen of a first application throughout the first and second displays 511 and 521, or may display an execution screen of the first application or that of a second application on each of the first and second displays 511 and 521.

Figure 6C:
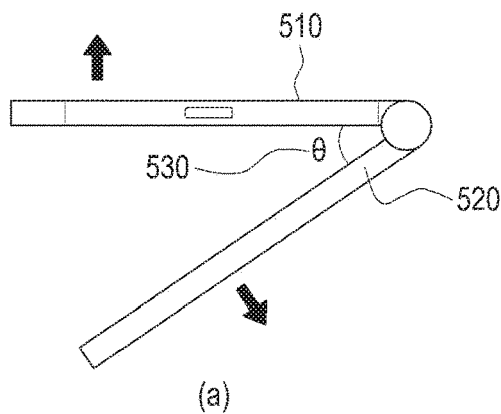
Figure 6C:
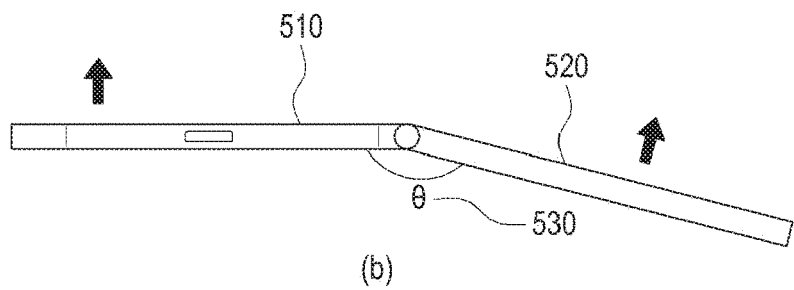

FIG. 6C illustrates the electronic device 101 that operates in a third mode when the electronic device 101 stands while the angle between the first and second body parts 510 and 520 is maintained at a predetermined angle as illustrated in FIG. 5D.

As illustrated in FIG. 6C, according to an angle 530 between the first and second body parts 510 and 520, the electronic device 101 may determine an operating mode thereof as the third mode. For example, when an angle 530 between the first and second body parts 510 and 520 ranges between 20 and 170 degrees, the electronic device 101 may operate in the third mode.

In the third mode, the electronic device 101 may turn on only one display among the first and second displays 511 and 521. In this regard, when there exists a screen of an application being displayed on the second display 521, the execution of the application may not be terminated. Also, the electronic device 101 may turn on both of the first and second displays 511 and 521 according to a user's operation, the user's configuration, or an application being executed.

In addition, the electronic device 101 may determine a display to be turned on, according to direction information thereof. Also, the electronic device 101 may use a display having been turned off, as an input means for backside touch.

Figure 6D:
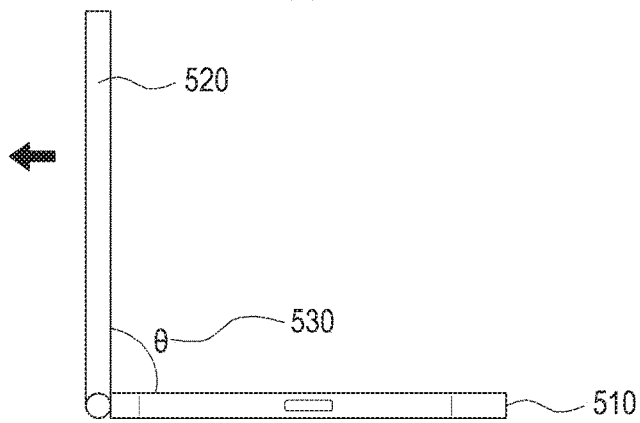

FIG. 6D illustrates the electronic device 101 that operates in a fourth mode when one display from among the first and second displays 511 and 521 is placed on the bottom surface as illustrated in FIG. 5E.

As illustrated in FIG. 6D, the electronic device 101 may determine an operating mode thereof as the fourth mode, according to an angle 530 between the first and second body parts 510 and 520 in a state in which one display from among the first and second displays 511 and 521 is placed on the bottom surface. When one display is placed on the bottom surface, the electronic device 101 may recognize that the display is placed on the bottom surface, using a sensor of the display.

For example, the electronic device 101 may operate in the fourth mode when, in a state in which the first display 510 is placed on the bottom surface, the angle 530 between the first and second body parts 510 and 520 ranges between 20 and 90 degrees.

In the fourth mode, the electronic device 101 may turn on one display, placed on the bottom surface, and the other display, and may turn on only the other display. For example, when the first display 511 is placed on the bottom surface, the first display 511 may be turned off, and the second display 521 may be turned on.

Each of the above-described operating modes of the electronic device 101 is described only by way of example, and thus the present disclosure is not limited thereto. The operations described as being performed in each of the operating modes may be performed in another operating mode, and the operating modes may be further subdivided to distinguish therebetween. Also, it will be apparent to those skilled in the art that the angle between the first and second body parts 410 and 420, which is described in order to distinguish between the operating modes, may be variously set.

Figure 7:
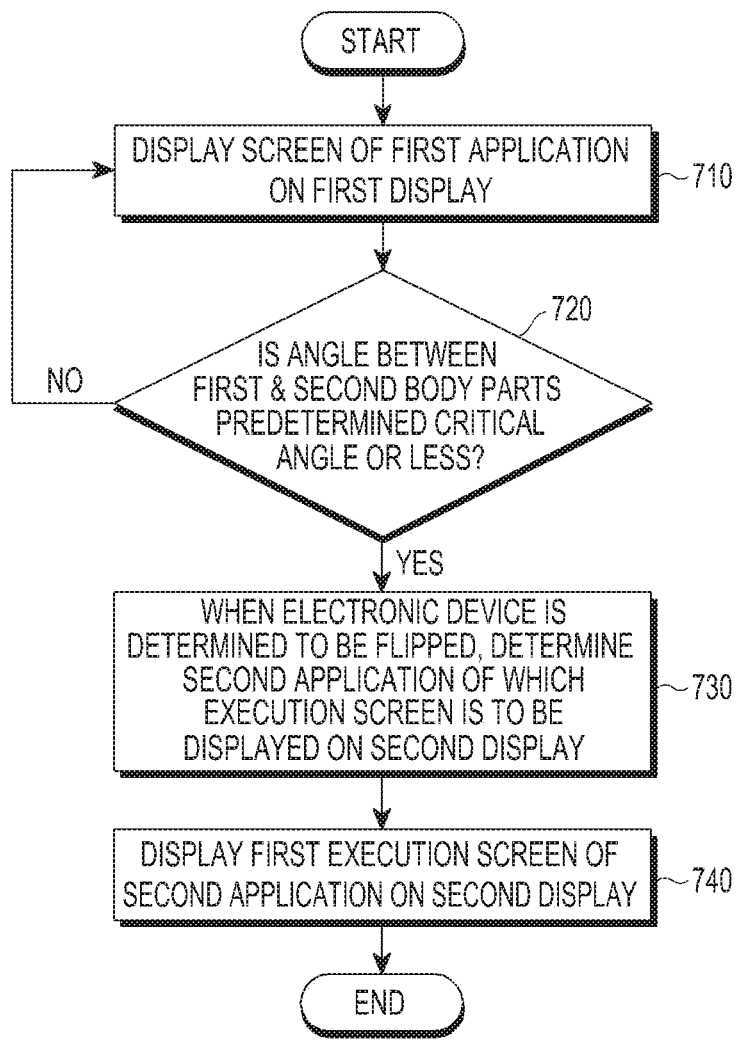
FIG. 7 is a flowchart illustrating an operating method of an electronic device according to various embodiments of the present disclosure.

FIG. 7 is a flowchart illustrating an operating method of an electronic device according to various embodiments of the present disclosure.

In operation 710, the electronic device 101 may display a screen of a first application on the first display. The electronic device 101 may display, on the first display, a screen of an application being executed.

In operation 720, the electronic device 101 may determine whether an angle between the first body part and the second body part is smaller than or equal to a predetermined critical angle. The predetermined critical angle may be set in a range in which a user who views a screen of the first application displayed on the first display cannot view a screen displayed on the second display. Alternatively, the predetermined critical angle may be set in a range in which the user who views a screen of the first application displayed on the first display cannot view the entire screen displayed on the second display.

In operation 730, since the electronic device 101 is determined to be flipped when an angle between the first and second body parts is smaller than or equal to the predetermined critical angle, the electronic device 101 may determine a second application of which an execution screen is to be displayed on the second display among multiple applications stored in the electronic device 101. A specific method for determining the second application will be described below.

In operation 740, the electronic device 101 may display a first execution screen of the second application on the second display.

Figure 8:
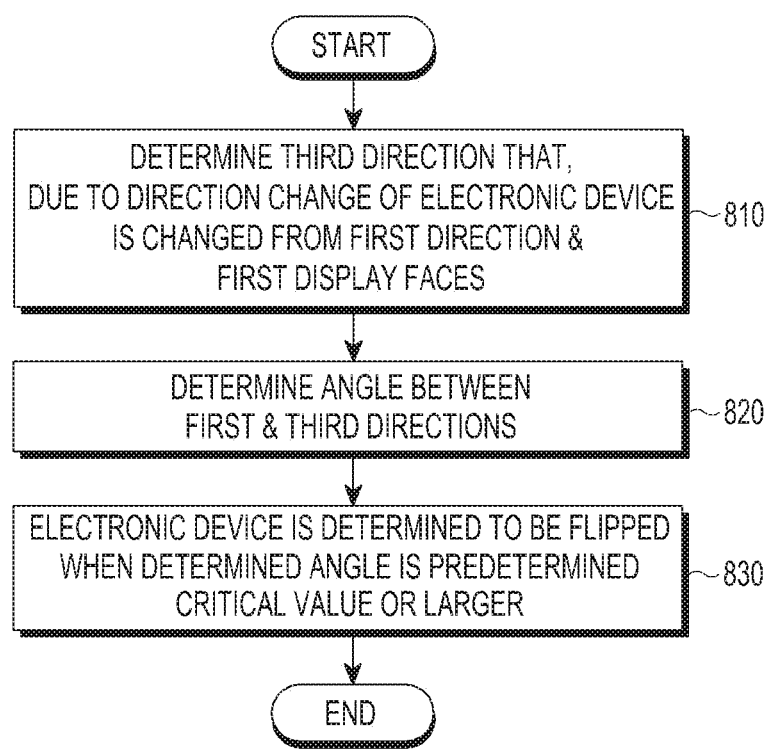
FIG. 8 is a flowchart illustrating a method for determining, by an electronic device, whether the electronic device is flipped according to various embodiments of the present disclosure.

FIG. 8 is a flowchart illustrating a method for determining, by an electronic device, whether the electronic device is flipped according to various embodiments of the present disclosure.

In operation 810, when a direction change of the electronic device 101 is detected, the electronic device 101 may determine a third direction that, due to the direction change of the electronic device 101, is changed from the first direction and the first display faces.

In operation 820, the electronic device 101 may determine an angle between the first direction and the third direction on the basis of a result of the determination.

In operation 830, when the angle between the first direction and the third direction is larger than or equal to a predetermined critical value, the electronic device 101 may determine that the same is flipped.

The critical value may be set based on the magnitude of an angle for determination of whether the electronic device 101 is flipped. For example, when the electronic device 101 is assumed to be completely flipped in a case where the angle between the first and third directions is 180 degrees in a state in which one side of the first body part comes in contact with one side of the second body part, the critical value may be set to an angle approximating 180 degrees, for example, an angle ranging between 160 and 180 degrees.

Also, the critical value may be set according to the current state between the first and second body parts, for example, the angle therebetween.

The above description has been made of the method for determining, by the electronic device 101, whether the electronic device 101 is flipped, using a direction that the first display faces, but the present disclosure is not limited thereto. The electronic device 101 may determine not only a direction that the first display faces, but also a direction that the second display faces, and may determine whether the electronic device 101 is flipped, using at least one of the direction that the first display faces and the direction that the second display faces.

Figure 9:
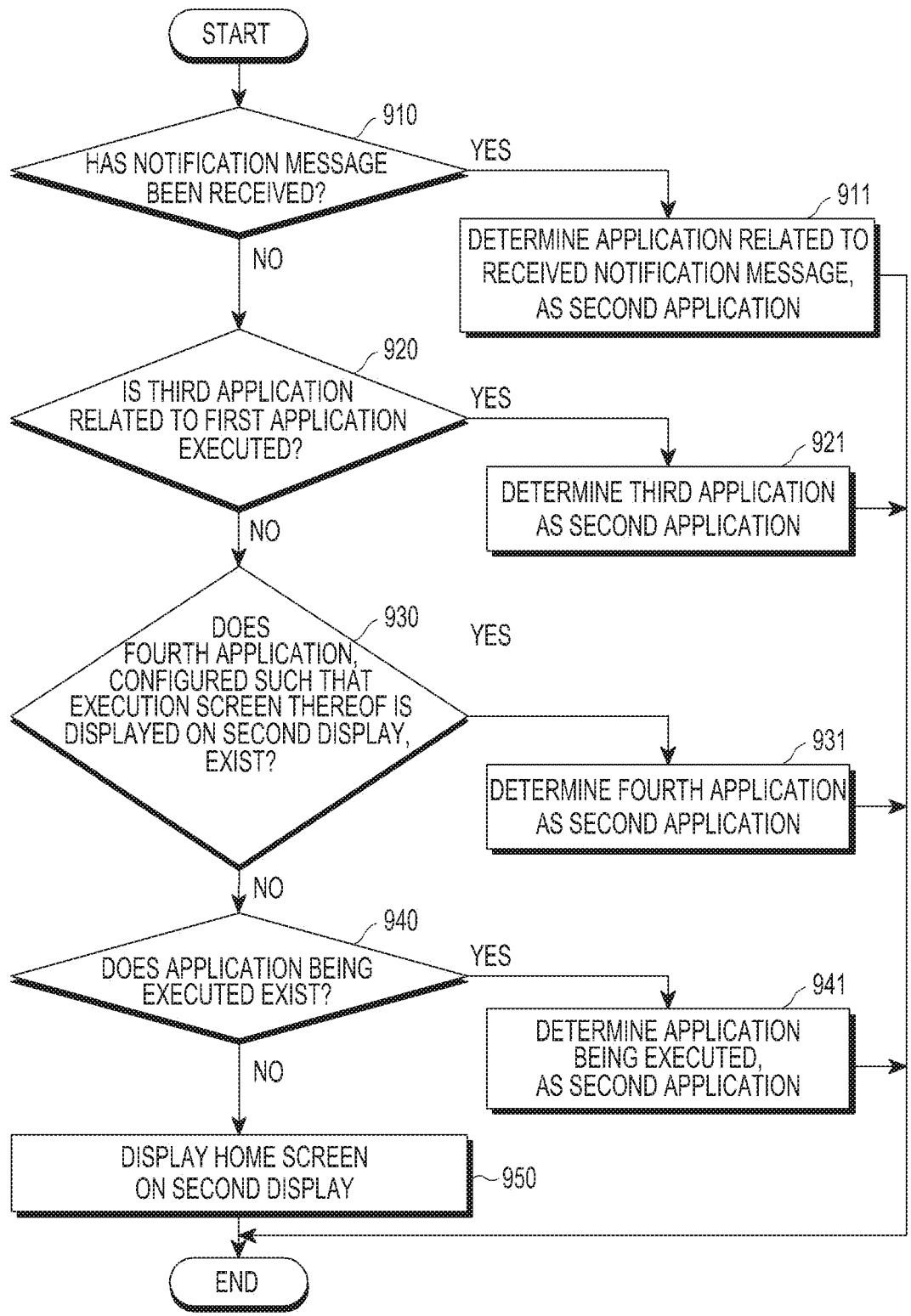
FIG. 9 is a flowchart illustrating a method for determining, by an electronic device, a second application of which an execution screen is to be displayed on a second display according to various embodiments of the present disclosure.

FIG. 9 is a flowchart illustrating a method for determining, by an electronic device, a second application of which an execution screen is to be displayed on a second display according to various embodiments of the present disclosure.

In operation 910, in order to determine the second application, the electronic device 101 may determine whether a notification message has been received.

Examples of the notification message may include messages, which notify of occurrences of respective events in multiple applications, such as Short Message Service (SMS) message reception, email reception, instant-message reception notification, add-friend notification through an instant messenger application, SNS posting update status notification, and coupon provision notification.

When the notification message has been received, in operation 911, the electronic device 101 may determine, as the second application, an application related to the received notification message. For example, when an SMS message is received, the electronic device 101 may determine an SMS message application as the second application. Alternatively, when an email is received, the electronic device 101 may determine an email application as the second application.

When the notification message has not been received, in operation 920, the electronic device 101 may determine whether a third application related to a first application is executed. The third application may be configured to be related to the first application, and may be used in such a manner as to be paired with the first application.

When the third application configured to be related to the first application is being executed, in operation 921, the electronic device 101 may determine the third application as the second application of which an execution screen is to be displayed on the second display.

When the third application is not being executed, in operation 930, the electronic device 101 may determine whether there exists a fourth application which is configured such that an execution screen thereof is displayed on the second display.

When the fourth application exists, in operation 931, the electronic device 101 may determine the fourth application as the second application.

When the fourth application does not exist, in operation 940, the electronic device 101 may determine whether at least one application being executed exists among multiple applications included in the electronic device 101.

When the at least one application being executed exists, in operation 941, the electronic device 101 may determine, as the second application, one application from among the at least one application being executed.

The electronic device 101 may select any one application among the at least one application being executed or may select one application according to a user input, and may determine the selected application as the second application.

When the application being executed does not exist among multiple applications, in operation 950, the electronic device 101 may display a home screen on the second display.

However, the above-described method for determining a second application is described only by way of example, and thus the present disclosure is not limited thereto. As described above, the description has been made in the order in which the processor 120 preferentially checks a notification message, checks whether the third application is executed, checks whether the fourth application exists, and then checks an application being executed, but the present disclosure is not limited thereto.

For example, the processor 120 may determine the third application as the second application regardless of whether a notification message has been received, or may determine the fourth application as the second application regardless of whether a notification message has been received and whether the third application is executed. In other words, the elements of the method for determining a second application may be independently performed, and the application order of the elements of the method for determining a second application may be changed according to the user's configuration or the like.

Figure 10:
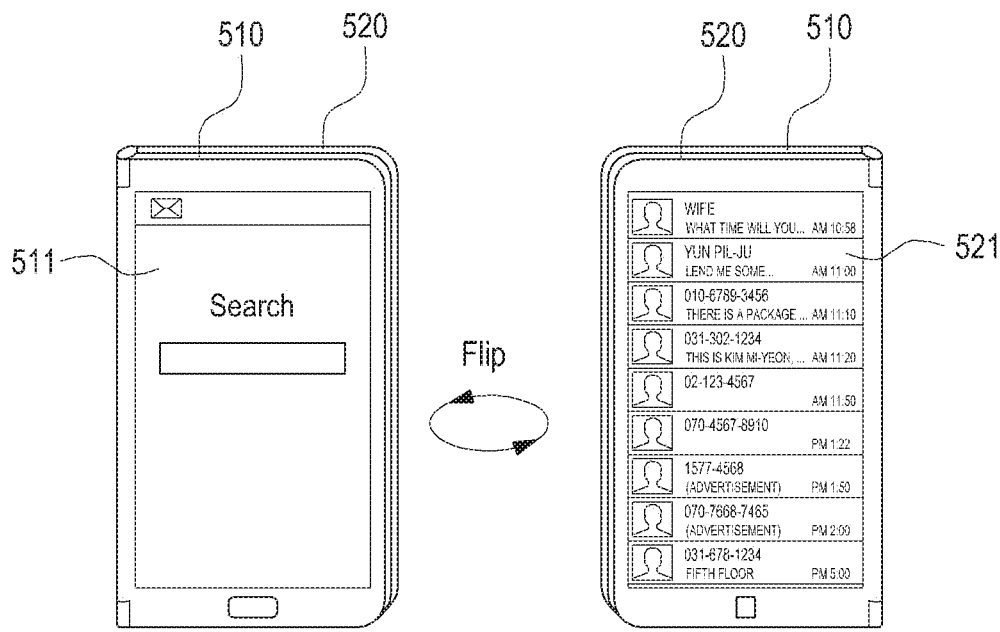
FIG. 10 illustrates an electronic device, which displays an execution screen of an application related to a notification message on a second display, according to various embodiments of the present disclosure.

FIG. 10 illustrates an electronic device, which displays an execution screen of an application related to a notification message on a second display, according to various embodiments of the present disclosure.

Referring to (a) of FIG. 10, the electronic device 101 may display an execution screen of a web browser application on a first display 511. While an execution screen of the web browser application is displayed on the first display 511, the electronic device 101 may receive an SMS message, and may display the reception of the SMS message on the first display 511.

Referring to (b) of FIG. 10, when the electronic device 101 is flipped by a user, the electronic device 101 may detect whether the electronic device 101 is flipped, and may display an execution screen of the SMS message application on the second display 521.

According to a result of the detection of whether the electronic device 101 is flipped, the electronic device 101 may determine whether an SMS message has been received. When the SMS message has been received, the electronic device 101 may determine the SMS message application as a second application of which an execution screen is to be displayed on the second display 521. The electronic device

101 may display an execution screen of the SMS message application on the second display 521, and thus a user may check the received SMS message through only an operation of flipping the electronic device 101, without entering a separate additional input for checking an SMS message.

Figure 11:
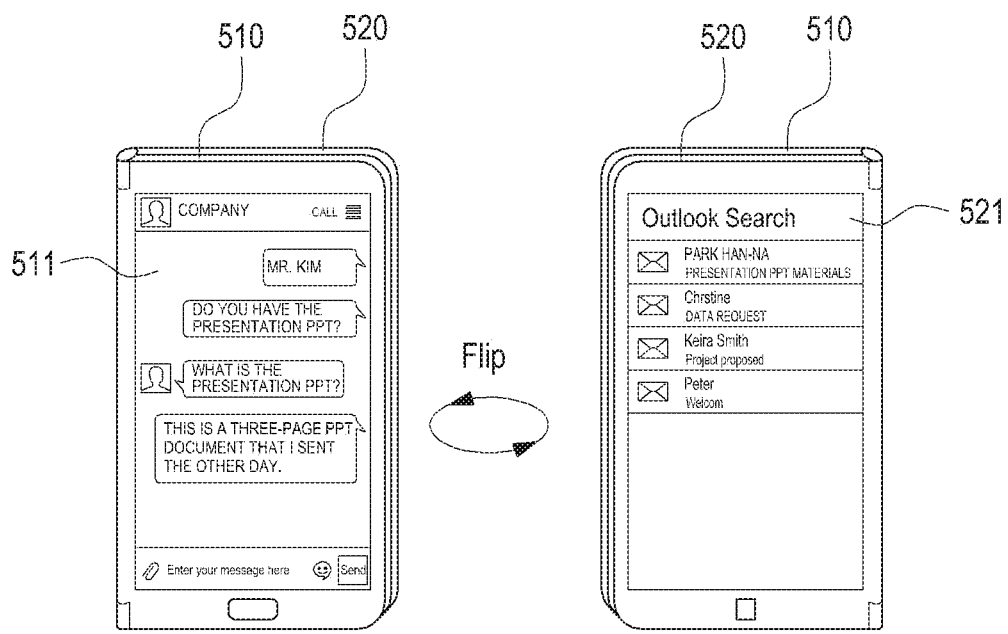
FIG. 11 illustrates an electronic device, which displays an execution screen of a third application related to a first application on a second display, according to various embodiments of the present disclosure.

FIG. 11 illustrates an electronic device, which displays an execution screen of a third application related to a first application on a second display, according to various embodiments of the present disclosure.

Referring to (a) of FIG. 11, the electronic device 101 may display an execution screen of an instant messenger application on a first display 511. Consideration is given to a case where an application related to the instant messenger application is an email application.

Referring to (b) of FIG. 11, when the electronic device 101 is flipped by a user, the electronic device 101 may detect whether the electronic device 101 is flipped, and may display, on the second display 521, an execution screen of an email application related to the instant messenger application.

According to a result of the detection of whether the electronic device 101 is flipped, the electronic device 101 may determine whether an email application related to the instant messenger application is executed. When the email application is being executed, the electronic device 101 may determine the email application as a second application of which an execution screen is to be displayed on the second display 521.

Also, when the email application is not being executed, the electronic device 101 may display, on the second display 521, a message for checking whether the email application is to be executed. Then, when an input for executing the email application is received from the user, the electronic device 101 may display the email application on the second display 521.

Further, when the email application is not being executed, even without receiving the user input for executing the email application, the electronic device 101 may execute the email application, and may display a screen of the email application on the second display 521.

Figure 12:
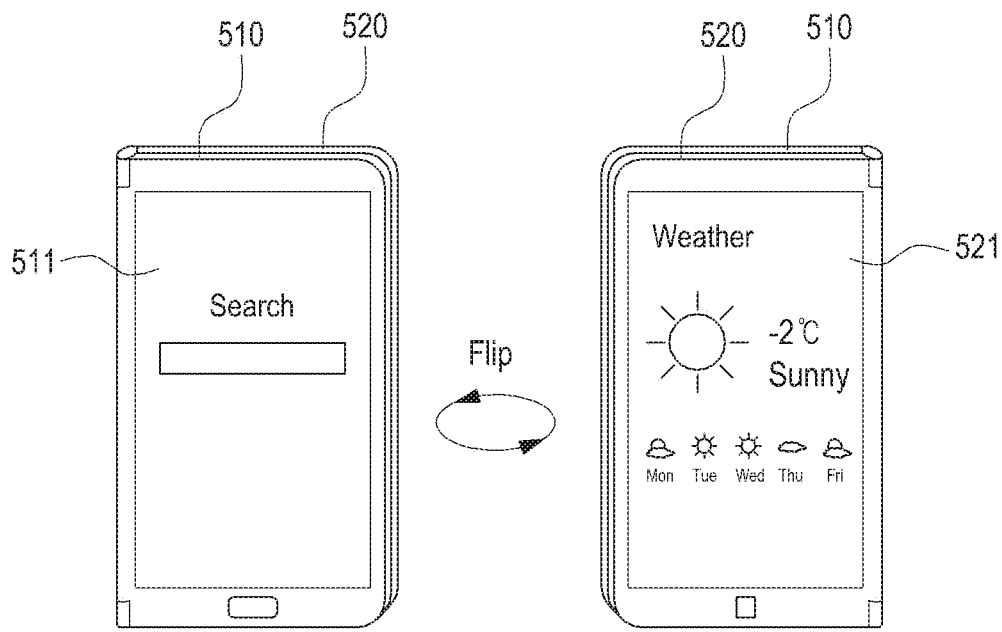
FIG. 12 illustrates an electronic device, which displays an execution screen of a fourth application configured such that the execution screen thereof is displayed on a second display, according to various embodiments of the present disclosure.

FIG. 12 illustrates an electronic device, which displays an execution screen of a fourth application configured such that the execution screen thereof is displayed on a second display, according to various embodiments of the present disclosure.

Referring to (a) of FIG. 12, the electronic device 101 may display an execution screen of a web browser application on a first display 511. Consideration is given to a case where an application configured such that an execution screen thereof is displayed on the second display 521 is weather information application.

Referring to (b) of FIG. 12, when the electronic device 101 is flipped by a user, the electronic device 101 may detect whether the electronic device 101 is flipped, and may display, on the second display 521, an execution screen of the weather information application which is configured such that the execution screen thereof is displayed on the second display 521.

According to a result of the detection of whether the electronic device 101 is flipped, the electronic device 101 may determine whether there exists a weather information application which is configured such that an execution screen thereof is displayed on the second display 521. When it is determined that the weather information application exists, the electronic device 101 may determine the weather information application as a second application of which an execution screen is to be displayed on the second display 521, and may display an execution screen of the weather information application on the second display 521.

Figure 13:
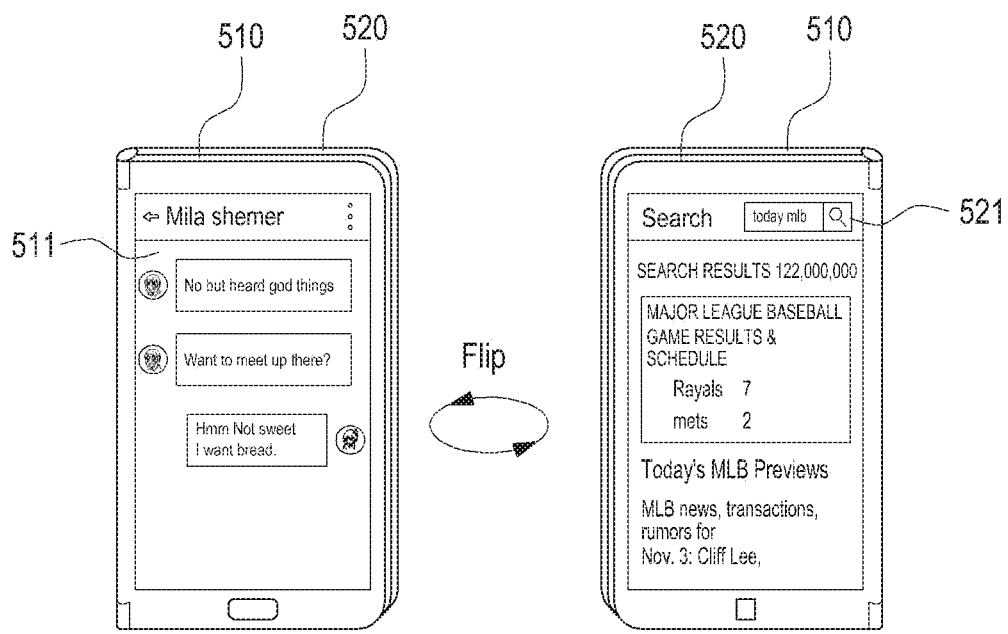
FIG. 13 illustrates an electronic device that displays, on a second display, an application being executed according to various embodiments of the present disclosure.

FIG. 13 illustrates an electronic device that displays, on a second display, an application being executed according to various embodiments of the present disclosure.

Referring to (a) of FIG. 13, the electronic device 101 may display an execution screen of an instant messenger application on a first display 511 Consideration is given to a case where an application, which is currently being executed by the electronic device 101, is a web browser application.

Referring to (b) of FIG. 13, when the electronic device 101 is flipped by a user, the electronic device 101 may detect whether the electronic device 101 is flipped, and may display, on the second display 521, an execution screen of the web browser application being executed.

According to a result of the detection of whether the electronic device 101 is flipped, the electronic device 101 may determine whether an application being executed exists. When it is determined that the application being executed is a web browser application, the electronic device 101 may determine the web browser application as a second application of which an execution screen is to be displayed on the second display 521, and may display an execution screen of the web browser application on the second display 521.

Figure 14:
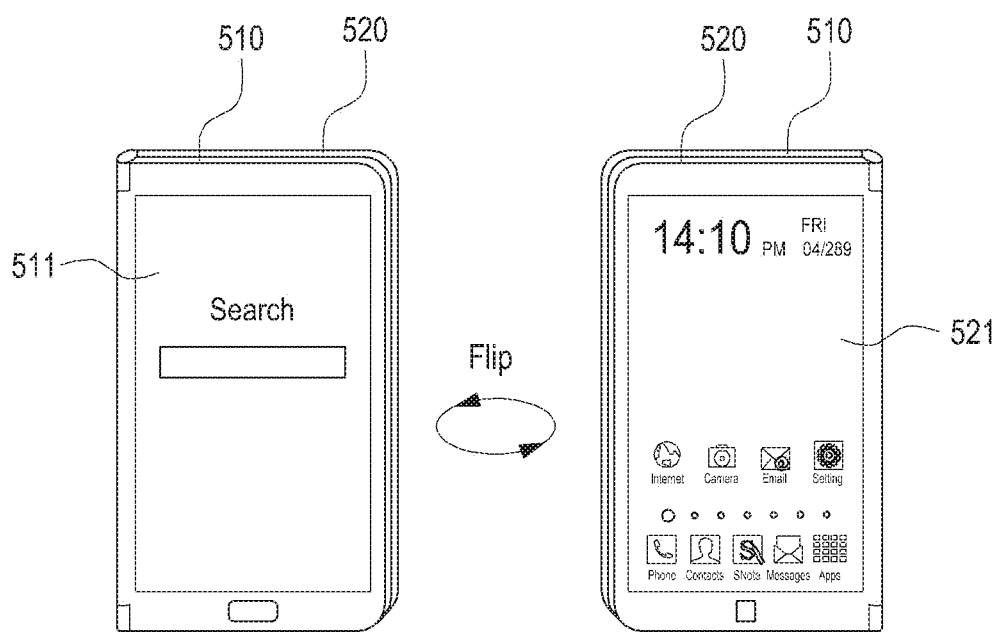
FIG. 14 illustrates an electronic device, which displays a home screen on a second display, according to various embodiments of the present disclosure.

FIG. 14 illustrates an electronic device, which displays a home screen on a second display, according to various embodiments of the present disclosure.

Referring to (a) of FIG. 14, the electronic device 101 may display an execution screen of a web browser application on a first display 511.

When the electronic device 101 is flipped by a user, the electronic device 101 may detect whether the same is flipped, and may determine a second application of which an execution screen is to be displayed on the second display 521.

However, when the electronic device 101 fails to determine a second application of which an execution screen is to be displayed on the second display 521, the electronic device 101 may display a predetermined screen.

The predetermined screen may be the home screen illustrated in (b) of FIG. 14, a lock screen, a standby screen, or the like.

Figure 15:
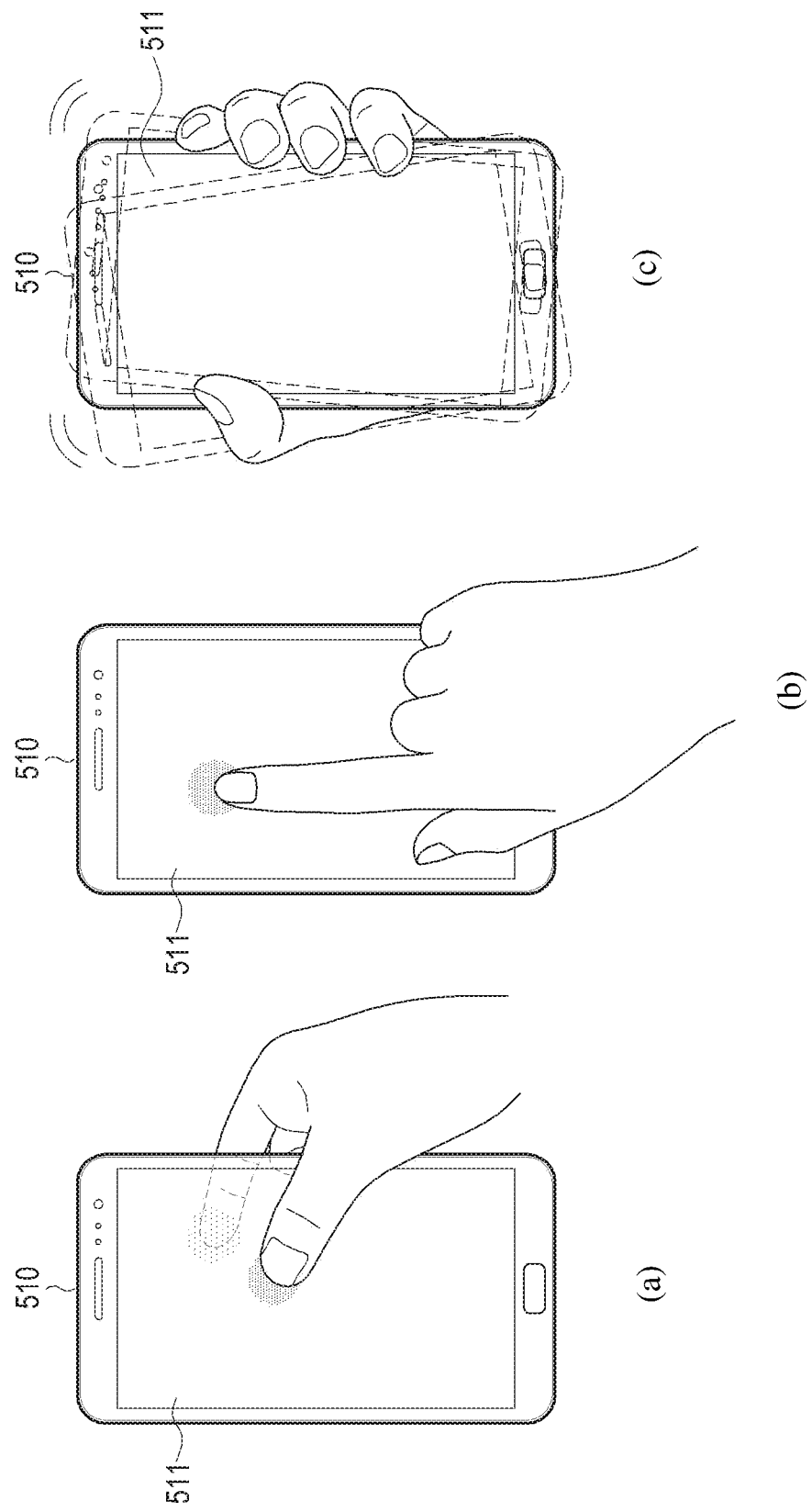
FIG. 15 illustrates types of inputs for displaying information of an application received from a user according to various embodiments of the present disclosure.

FIG. 15 illustrates types of inputs for displaying information of an application received from a user according to various embodiments of the present disclosure.

According to various embodiments of the present disclosure, when an angle between a first body part and a second body part is smaller than or equal to a predetermined critical angle and a predetermined input is received from the user through an input interface, an electronic device may be determined to be flipped, and thus may display, on a second display, a first application, first content being executed by the first application, or information related to information acquired by the electronic device.

Referring to (a) of FIG. 15, the predetermined input may be a touch input for touching both of a first display 511 and a second display 521. Also, referring to (b) of FIG. 15, the predetermined input may be a touch input for touching only the first display 511. Also, referring to (c) of FIG. 15, the predetermined input may be an input entered through the motion of the electronic device 101, for example, an input entered by shaking the same.

Further, although not illustrated, each of various inputs, which can be entered to an input means of the electronic device 101 according to a user's configuration and the like, may be used as the predetermined input.

Figure 16:
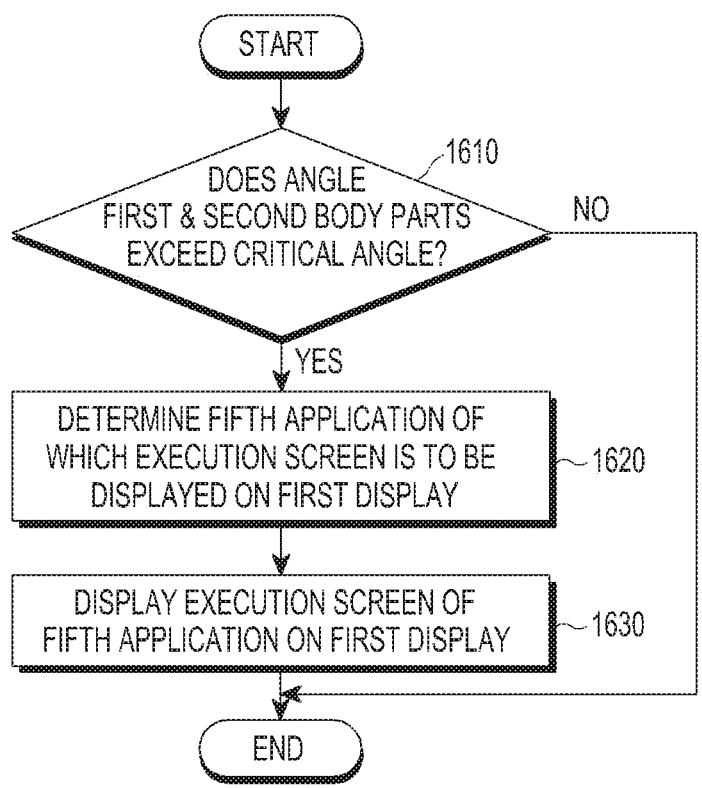
FIG. 16 a flowchart illustrating a method for determining an application of which an execution screen is to be displayed on each of multiple displays in a state in which a first body part and a second body part are unfolded according to various embodiments of the present disclosure.

FIG. 16 a flowchart illustrating a method for determining an application of which an execution screen is to be displayed on each of multiple displays in a state in which a first body part and a second body part are unfolded according to various embodiments of the present disclosure.

In operation 1610, the electronic device 101 may determine whether an angle between the first and second body parts exceeds a predetermined critical angle.

As described above, the predetermined critical angle may be set in a range in which a user who views a screen of a first application displayed on the first display cannot view a screen displayed on the second display. In the present example, the predetermined critical angle may be set in the range of 0 to 90 degrees. Accordingly, when an angle between the first and second body parts exceeds the predetermined critical angle, the user may view all screens displayed on each of the first and second displays.

In operation 1620, when an angle between the first and second body parts exceeds the predetermined critical angle, the electronic device 101 may determine a fifth application of which an execution screen is to be displayed on the first display among multiple applications.

After the electronic device 101 is flipped, the user may view only a screen displayed on the second display, but when an angle between the first and second body parts exceeds the predetermined critical angle, the user may view both of the first and second displays. Therefore, it is necessary to determine the fifth application.

In operation 1630, the electronic device 101 may display an execution screen of the determined fifth application on the first display 511.

FIGS. 17A to 17G each illustrate an electronic device, which displays respective execution screens of multiple applications on multiple displays in a state in which a first body part and a second body part are unfolded according to various embodiments of the present disclosure.

Figure 17A:
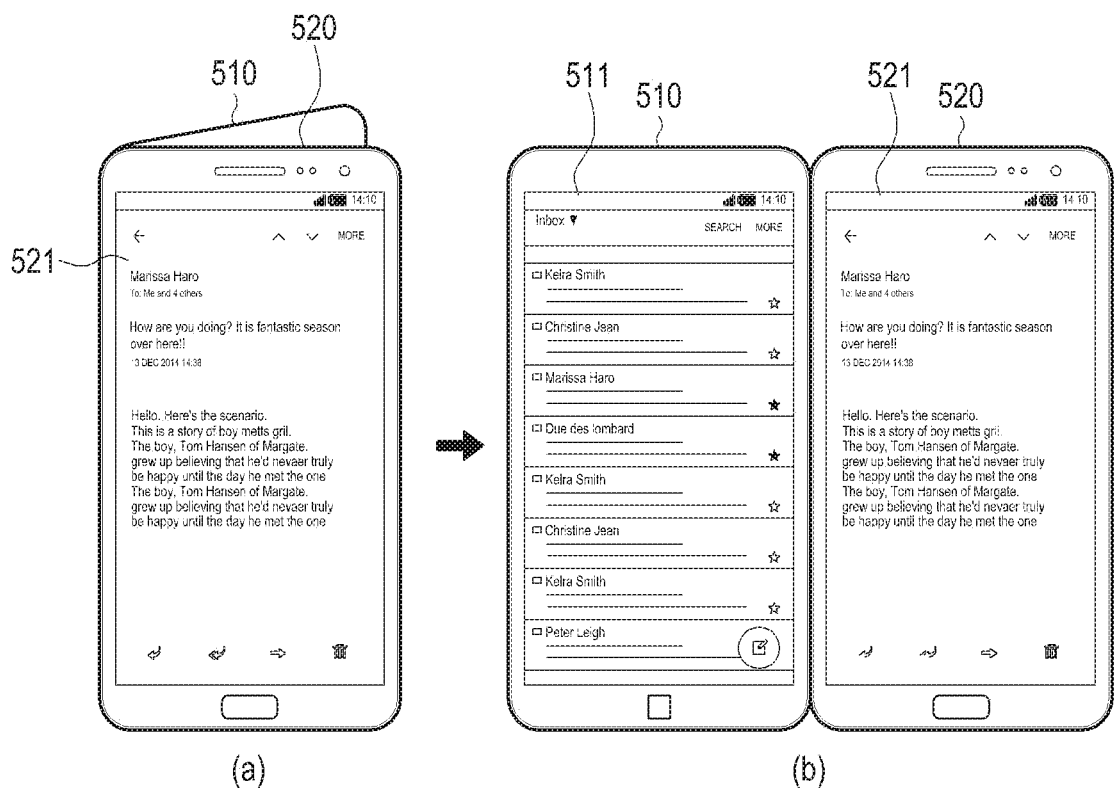
FIGS. 17A to 17G each illustrate an electronic device, which displays respective execution screens of multiple applications on multiple displays in a state in which a first body part and a second body part are unfolded according to various embodiments of the present disclosure.

Referring to (a) of FIG. 17A, when an angle between the first and second body parts is smaller than or equal to the predetermined critical angle, the electronic device 101 may display a screen of an email application on the second display 521.

Thereafter, when a user causes an angle between the first and second body parts to exceed the predetermined critical angle, as illustrated in (b) of FIG. 17A, the electronic device 101 may display, on the first display 511, a second execution screen of the email application which displays a list of emails.

As described above, since the user causes an angle between the first and second body parts to exceed the predetermined critical angle, another execution screen of a second application of which an execution screen is displayed on the second display 521 may be displayed on the first display 511.

Figure 17B:
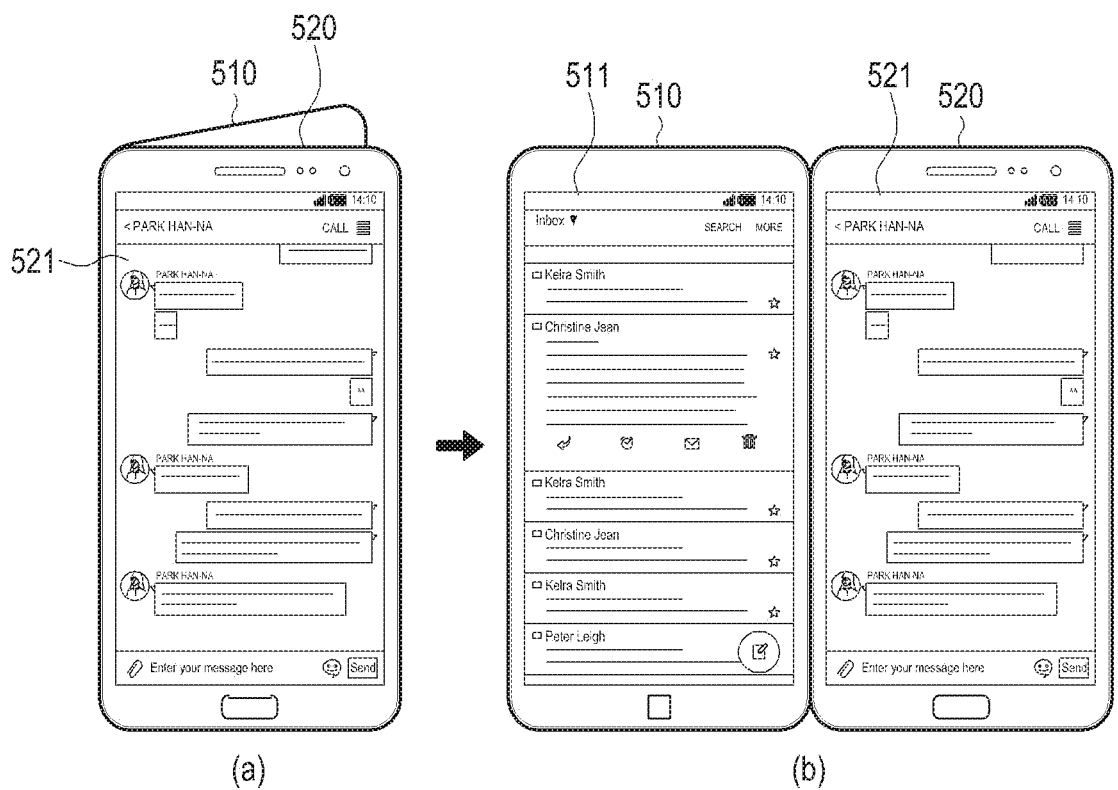

Referring to (a) of FIG. 17B, when an angle between the first and second body parts is smaller than or equal to the predetermined critical angle, the electronic device 101 may display, on the second display 521, a screen of an instant messenger application.

Thereafter, when the user causes an angle between the first and second body parts to exceed the predetermined critical angle, as illustrated in (b) of FIG. 17B, the electronic device 101 may display, on the first display 511, an email application configured to be related to the instant messenger application.

By this configuration, even without entering a selection-and-execution input for executing a related application, the user may allow the related application to be displayed on the first display 511 through only an action of rotating at least one of the first and second body parts.

Figure 17C:
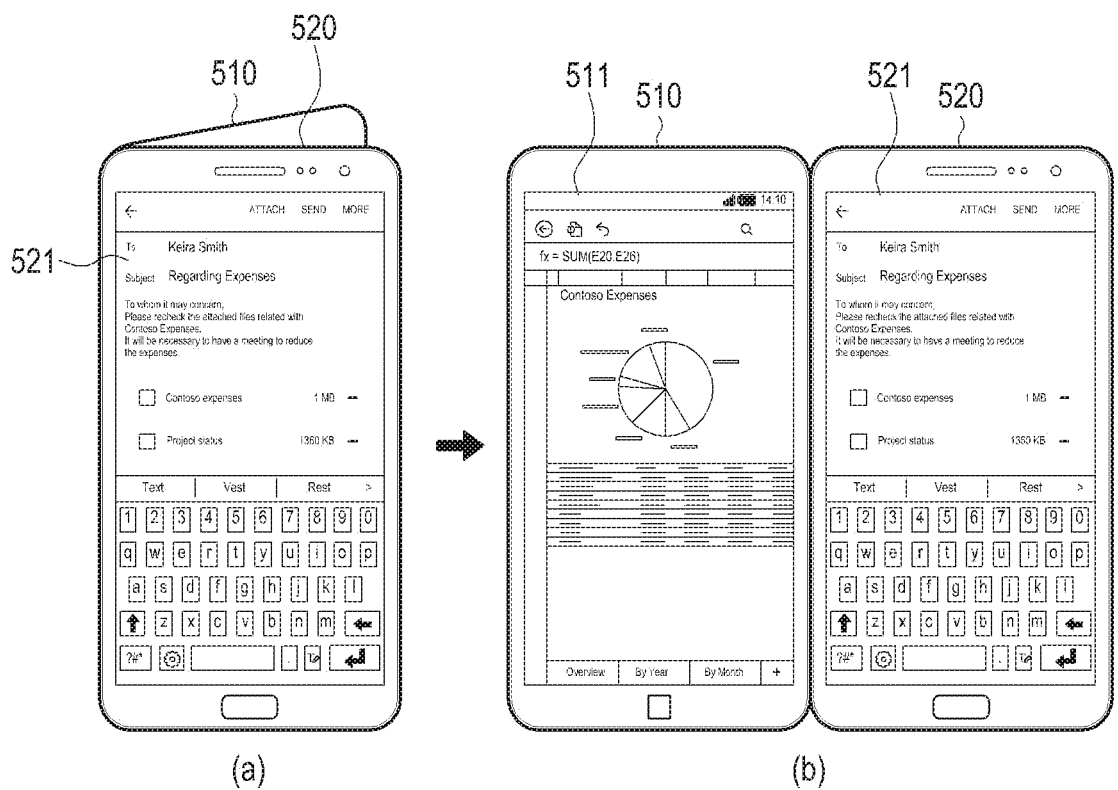

Referring to (a) of FIG. 17C, when an angle between the first and second body parts is smaller than or equal to the predetermined critical angle, the electronic device 101 may display a screen of an email application on the second display 521.

Thereafter, when the user causes an angle between the first and second body parts to exceed the predetermined critical angle, as illustrated in (b) of FIG. 17C, the electronic device 101 may display, on the first display 511, an execution screen of an application related to an attached document included in an email. The electronic device 101 may display, on the first display 511, the attached document through the application related to the attached document.

By this configuration, even without entering a selection-and-execution input for checking an attached document, the user may allow the attached document to be displayed on the first display 511 through only an action of rotating at least one of the first and second body parts.

Figure 17D:
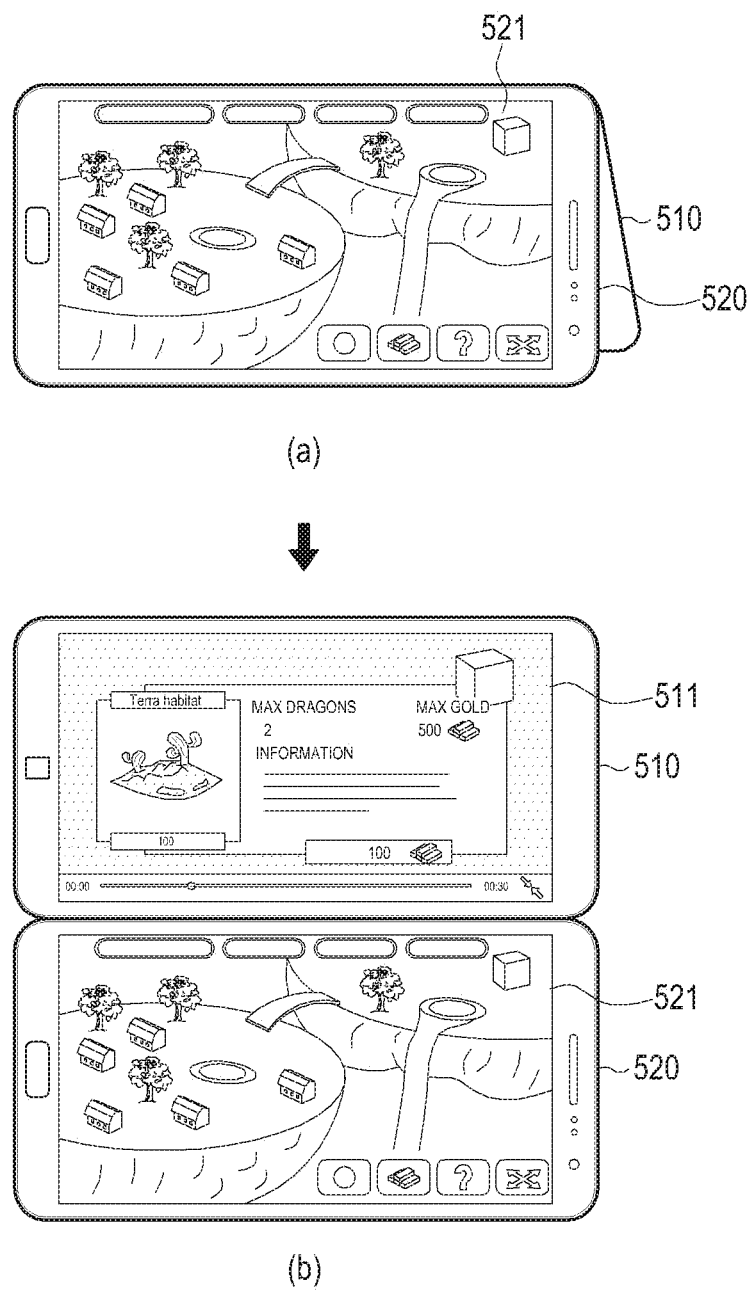

Referring to (a) of FIG. 17D, when an angle between the first and second body parts is smaller than or equal to the predetermined critical angle, the electronic device 101 may display a screen of a game application on the second display 521.

Thereafter, when the user causes an angle between the first and second body parts to exceed the predetermined critical angle, as illustrated in (b) of FIG. 17D, the electronic device 101 may display, on the first display 511, an execution screen of a moving-image reproduction application for executing a moving image related to the game application.

By this configuration, the user may play a game while simultaneously viewing an image related to the game that he/she is playing.

Figure 17E:
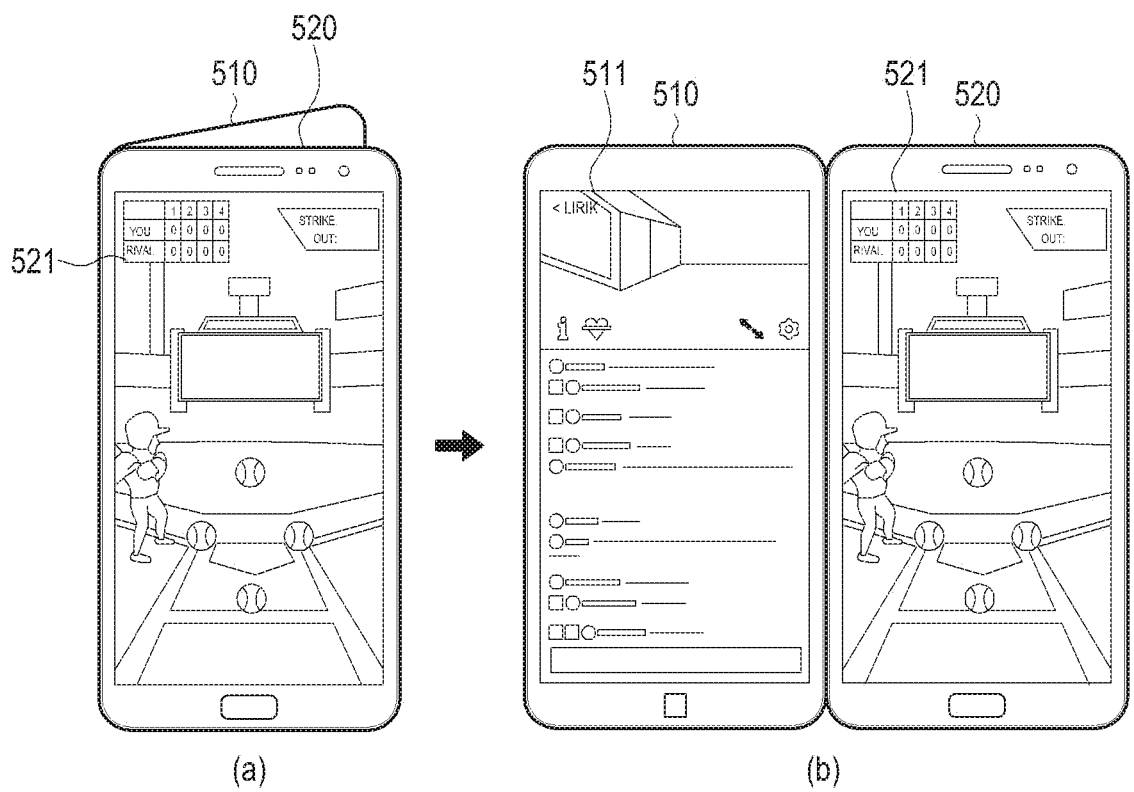

Referring to (a) of FIG. 17E, when an angle between the first and second body parts is smaller than or equal to the predetermined critical angle, the electronic device 101 may display a screen of a game application on the second display 521.

Thereafter, when the user causes an angle between the first and second body parts to exceed the predetermined critical angle, as illustrated in (b) of FIG. 17E, the electronic device 101 may display, on the first display 511, an execution screen of a broadcast application for displaying a broadcast related to the game application.

By this configuration, the user may play a game while simultaneously viewing a broadcast related to the game that he/she is playing.

Figure 17F:
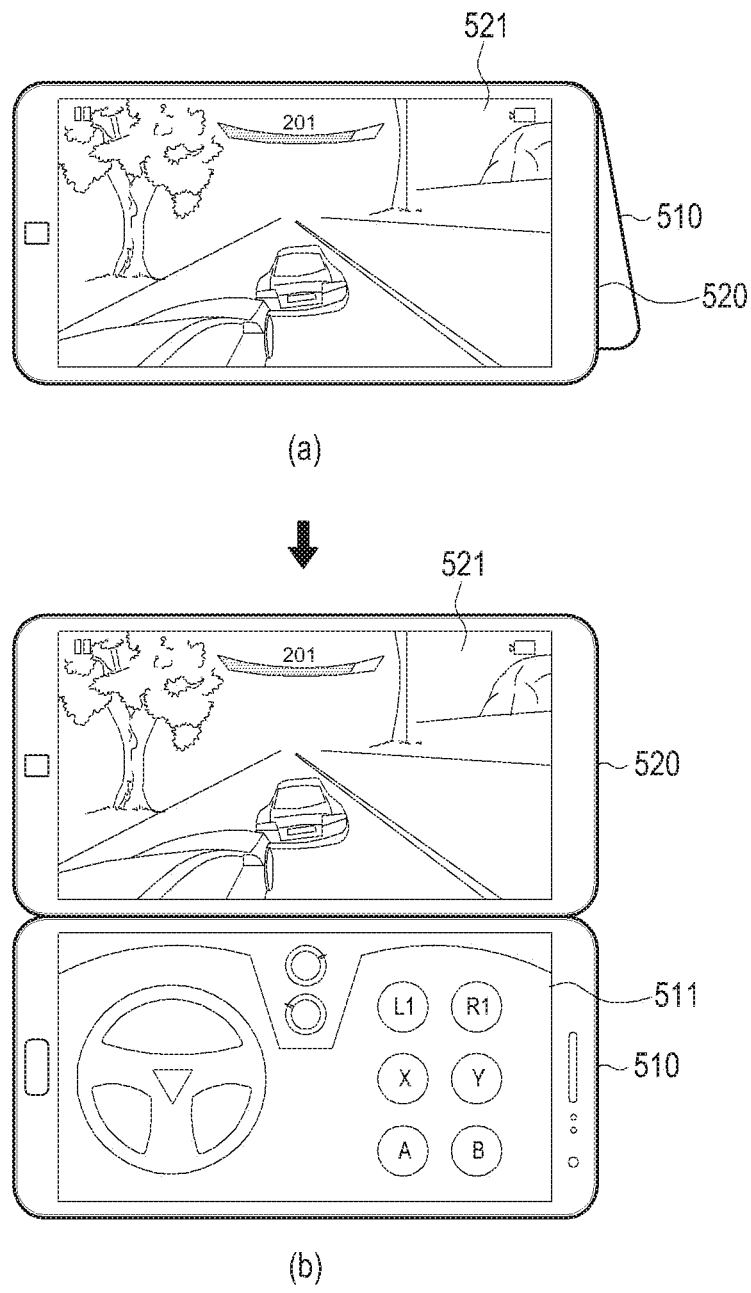

Referring to (a) of FIG. 17F, when an angle between the first and second body parts is smaller than or equal to the predetermined critical angle, the electronic device 101 may display a screen of a game application on the second display 521.

Thereafter, when the user causes an angle between the first and second body parts to exceed the predetermined critical angle, as illustrated in (b) of FIG. 17F, the electronic device 101 may display, on the first display 521, an execution screen of a game controller application for providing an input to the game application. The game controller application may be configured as a separate application from the game application. Also, the electronic device 101 may display, on the first display 521, an input interface that the game application provides to the user so as to more conveniently enter a game input.

Figure 17G:
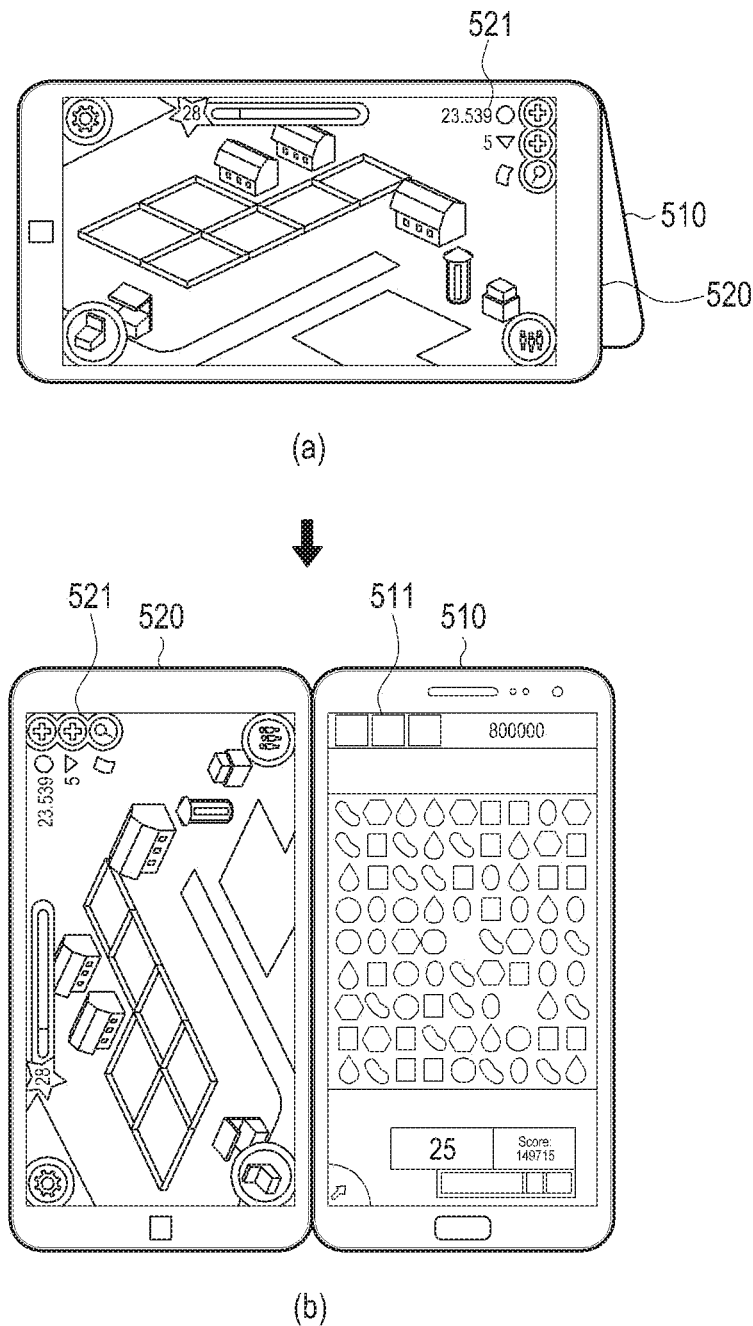

Referring to (a) of FIG. 17G, when an angle between the first and second body parts is smaller than or equal to the predetermined critical angle, the electronic device 101 may display a screen of a first game application on the second display 521.

Thereafter, when the user causes an angle between the first and second body parts to exceed the predetermined critical angle, as illustrated in (b) of FIG. 17G, the electronic device 101 may display a screen of a second game application on the first display 521.

The second game application may be a game application related to the first game application, or may be a different type of game application that the user is executing simultaneously with the first game application.

Figure 18:
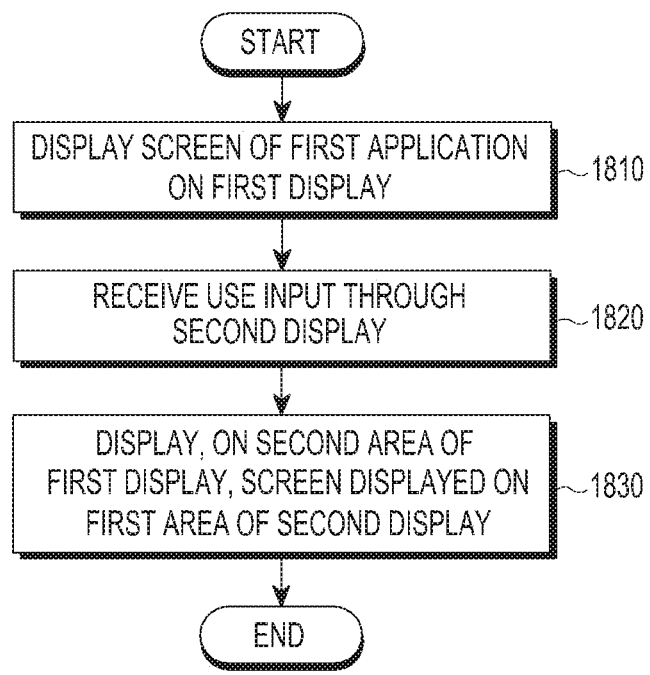
FIG. 18 is a flowchart illustrating an operating method of an electronic device according to various embodiments of the present disclosure.

FIG. 18 is a flowchart illustrating an operating method of an electronic device according to various embodiments of the present disclosure.

In operation 1810, the electronic device 101 may display an execution screen of a first application on the first display. The electronic device 101 may display, on the first display, a screen of an application being executed.

Also, the electronic device 101 may display, through the second application, another execution screen of the first application, an execution screen of a second application, an image and information related to the first application or first content executed by the first application, and the like.

In operation 1820, when an angle between the first and second body parts is smaller than or equal to a predetermined critical angle, the electronic device 101 may receive a user input through the second display.

When an angle between the first and second body parts is smaller than or equal to the predetermined critical angle and a user is currently staring at the first display, the user may not view a screen of the second display.

In operation 1830, the electronic device 101 may display a screen, which is displayed on a first area of the second display corresponding to the user input received through the second display, on a second area of the first display.

The position and size of the first area may be variably determined according to the user input. The position and size of the second area of the first display may be identical to those of the first area of the second display, or may be different therefrom according to the user's configuration or the like.

Figure 19:
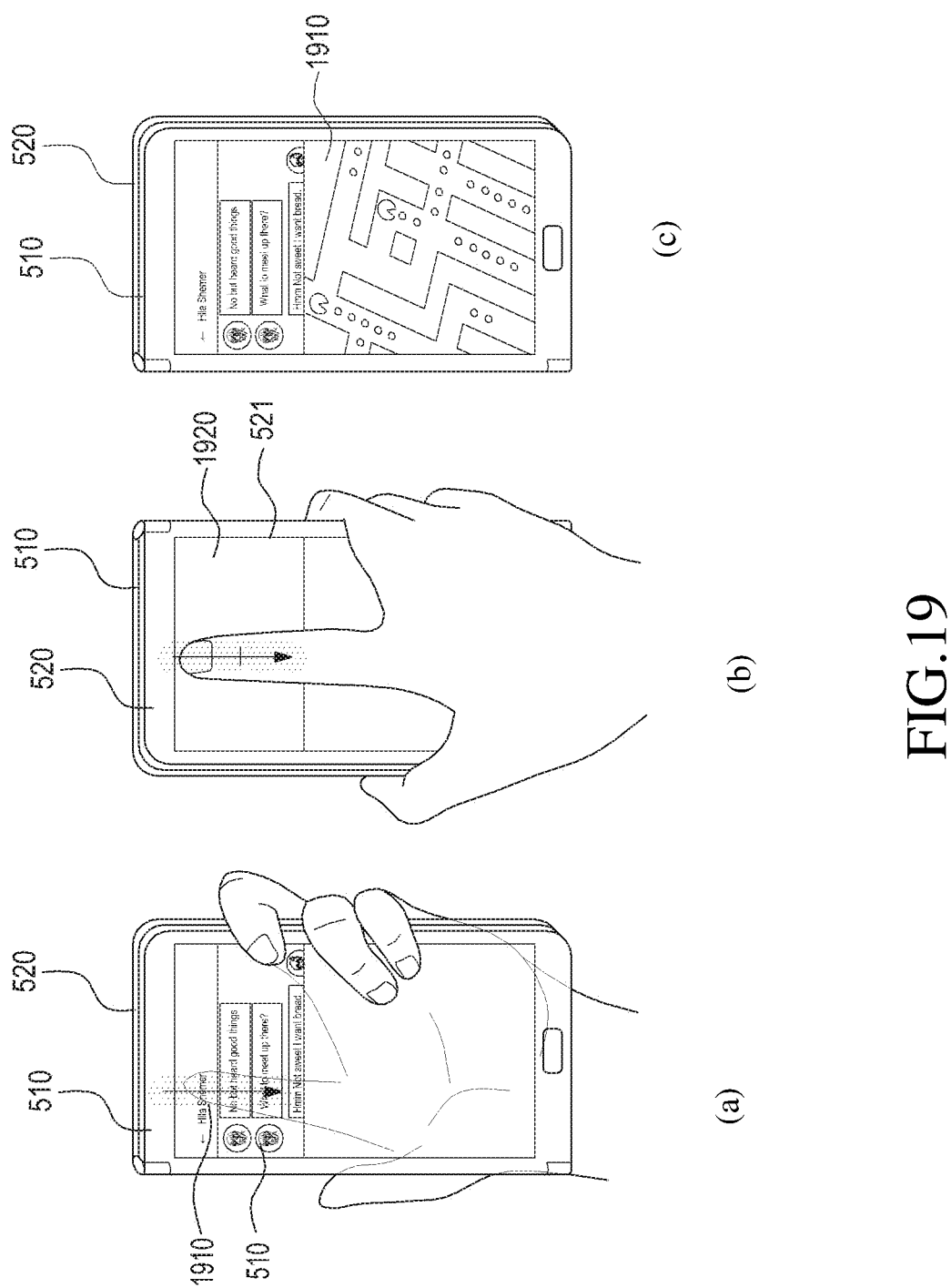
FIG. 19 is a view for explaining a process for displaying at least one area of a screen, displayed on a second display, on a first display according to various embodiments of the present disclosure.

FIG. 19 is a view for explaining a process for displaying at least one area of a screen, displayed on a second display, on a first display according to various embodiments of the present disclosure.

Referring to (a) of FIG. 19, in a state in which an execution screen of a first application is displayed on the first display 511, a user may enter a downward touch-and-drag input on the second display 521 in order to check a screen displayed on the second display 521.

As illustrated in (a) of FIG. 19, a second area 1910 of the first display 521, which corresponds to a first area of the second display 521 corresponding to the user input, may be determined to have a size and a position identical to those of the first area of the second display 521.

Also, although not illustrated, according to a user's configuration, the characteristics of an executed application, and the like, the second area 1910 of the first display 521 may have a size and a position different from those of the first area of the second display 521.

Referring to (b) of FIG. 19, a touch-and-drag input may be received from the user on the second display 521, and the first area 1920 of the second display 521 corresponding to the user input may be determined based on a point at which the touch input has been received and a point at which the drag input is received.

Also, in FIG. 19, an input for checking a screen displayed on the second display 521 is described as a touch-and-drag input, but the present disclosure is not limited thereto. Various inputs may be used as inputs for checking a screen displayed on the second display 521.

Referring to (c) of FIG. 19, when an input for checking a screen displayed on the second display 521 is received, the electronic device 101 may display, on the second area 1910 of the first display 511, a screen displayed on the first area 1920 of the second display 521. By this configuration, in order to check a screen displayed on the second display 521, without performing an action of flipping the electronic device 101, the user may merely enter an input for checking the same.

Also, while the user input is maintained, the electronic device 101 may display the screen, which is displayed on the first area 1920 of the second display 521, on the second area 1910 of the first display 511. Accordingly, when the user input is terminated, the processor 120 may no longer display the screen, which is displayed on the first area 1920 of the second display 521, on the second area 1910 of the first display 511.

Alternatively, regardless of whether the user input is maintained, until a separate use input for terminating the display of the first area 1920 of the second display 521 is received, the processor 120 may display the screen, which is displayed on the first area 1920 of the second display 521, on the second area 1910 of the first display 511.

Each of the elements described in the present disclosure may include one or more components, and the names of the corresponding elements may vary based on the type of electronic device. According to various embodiments, the electronic device may include at least one of the elements described in the present disclosure. Some elements may be omitted from the electronic device, or other additional elements may be further included therein. Also, some of the elements of the electronic device according to various embodiments may be combined into one entity, which may perform functions identical to those of the relevant elements before the combination thereof.

The term "module" used herein may refer to a unit including a combination of one or two or more of, for example, hardware, software, and firmware. The term "module" may be used interchangeably with, for example, the term "unit", "logic", "logical block", "component", or "circuit". The "module" may be a minimum unit of an integrated component, or a part thereof. The "module" may be a minimum unit for performing one or more functions, or a part thereof. The "module" may be mechanically or electronically implemented. For example, the "module" may include at least one of an Application-Specific Integrated Circuit (ASIC) chip, a Field-Programmable Gate Array (FPGA), or a programmable-logic device which performs certain operations and is already known or is to be developed in the future.

At least part of the device (e.g., modules or functions thereof) or the method (e.g., operations) according to various embodiments may be implemented by, for example, an instruction which is stored in a computer-readable storage medium in the form of a program module. When the instruction is executed by a processor (e.g., the processor 120), the at least one processor may perform a function corresponding to the instruction. The computer-readable storage medium may be, for example, the memory 130.

Examples of the computer-readable recording medium may include: magnetic media, such as a hard disk, a floppy disk, and a magnetic tape; optical media, such as a Compact Disc Read Only Memory (CD-ROM) and a Digital Versatile Disc (DVD); magneto-optical media, such as a floptical disk; hardware devices, such as a Read Only Memory (ROM), a Random Access Memory (RAM), and a flash memory; and the like. Also, the program instructions may include high-level language codes, which can be executed in a computer by using an interpreter and the like, as well as machine language codes made by a compiler. The above-described hardware device may be configured to operate as one or more software modules in order to perform the operation according to various embodiments, and vice versa.

The module or program module according to various embodiments may include at least one of the above-described elements, may further include other additional elements, or some of the above-described elements may be omitted. Operations executed by the module, program module, or other elements according to various embodiments may be executed sequentially, in parallel, repeatedly, or in a heuristic manner. Also, some operations may be executed in a different order or may be omitted, or other operations may be added.

Various embodiments provide a storage medium storing commands, wherein the commands may be configured to, when executed by at least one processor, cause the at least one processor to perform at least one operation including: displaying an execution screen of a first application on a first display; determining whether an electronic device is flipped on the basis of direction information; determining a second application of which an execution screen is to be displayed on the second display among multiple applications stored in the electronic device, when an angle between a first body part and a second body part constituting the electronic device is smaller than or equal to a predetermined angle and the electronic device is determined to be flipped; and displaying a first execution screen of the second application on the second display.

Various embodiments disclosed herein are merely provided to describe and facilitate the understanding of technical details of the present disclosure, and thus do not limit the scope of the present disclosure. Therefore, the scope of the present disclosure should be construed to include all modifications or other embodiments based on the technical idea of the present disclosure.

The invention claimed is:

1. An electronic device comprising:
a first body part;
a second body part hinge-coupled to the first body part such that one side thereof is capable of coming in contact with one side of the first body part;
a first display disposed on a different side of the first body part and facing a first direction;
a second display disposed on a different side of the second body part and facing a second direction;
a sensor configured to acquire direction information of the electronic device; and
a processor configured to:
control the first display to display an execution screen of a first application,
based on the direction information, determine whether the electronic device is turned over while an angle between the first body part and the second body part is maintained being smaller than or equal to a first predetermined critical angle,
determine a second application of which an execution screen is to be displayed on the second display among a plurality of applications stored in the electronic device, based on determining that the electronic device is turned over while the angle between the first body part and the second body part is maintained being smaller than or equal to the first predetermined critical angle, wherein the second application is different from the first application, and
control the second display to display a first execution screen of the second application.

2. The electronic device of claim 1, wherein the processor is further configured to:
determine whether a notification message is received, and
based on determining that the notification message is received, determine an application related to the received notification message, as the second application.

3. The electronic device of claim 2, wherein the processor is further configured to:
based on determining that the notification message is not received, determine whether a third application related to the first application is executed, and
based on determining that the third application is being executed, determine the third application as the second application.

4. The electronic device of claim 3, wherein the third application corresponds to an application which is configured to be related to the first application according to a user's configuration or characteristics of the first application.

5. The electronic device of claim 3, wherein the processor is further configured to:
based on determining that the third application is not being executed, determine whether there exists a fourth application which is configured such that an execution screen thereof is displayed on the second display, and
based on determining that the fourth application exists, determine the fourth application as the second application.

6. The electronic device of claim 5, wherein the processor is further configured to:
based on determining that the fourth application does not exist, determine, as the second application, one of at least one application being executed among the plurality of applications.

7. The electronic device of claim 6, wherein the processor is further configured to:
based on determining that an application is not being executed among the plurality of applications, control the second display to display a home screen.

8. The electronic device of claim 1, further comprising an input interface configured to receive an input from a user,
wherein the electronic device is determined to be turned over based on a predetermined input being received from the user through the input interface while the angle between the first body part and second body part is smaller than or equal to the first predetermined critical angle, and
wherein the processor is further configured to:
based on determining that the electronic device is turned over based on the predetermined input being received, control the second display to display at least one of the first application, first content being executed by the first application, or information acquired by the electronic device.

9. The electronic device of claim 1, wherein the processor is configured to:
detect a direction change of the electronic device according to the direction information, determine a third direction that the first display faces based on the detected direction change of the electronic device, and determine that the electronic device is turned over based on an angle between the first direction and the third direction being larger than or equal to a second predetermined critical angle.

10. The electronic device of claim 1, wherein the processor is further configured to:

determine whether the angle between the first body part and the second body part exceeds the first predetermined critical angle.

11. The electronic device of claim 10, the processor is further configured to:

based on determining that the angle between the first body part and the second body part exceeds the first predetermined critical angle, determine a fifth application of which an execution screen is to be displayed on the first display among the plurality of applications, and control the first display to display the execution screen of the fifth application.

12. The electronic device of claim 11, wherein the processor is further configured to:

determine, as the fifth application, a sixth application related to the second application or a seventh application selected by a user.

13. The electronic device of claim 11, wherein the processor is further configured to:

based on the fifth application being determined as the second application, control the first display to display a second execution screen of the second application.

14. An operating method of an electronic device, which comprises:

a first body part;

a second body part hinge-coupled to the first body part such that one side thereof is capable of coming in contact with one side of the first body part;

a first display disposed on a different side of the first body part and facing a first direction;

a second display disposed on a different side of the second body part and facing a second direction; and a sensor configured to acquire direction information of the electronic device, wherein the operating method comprises:

displaying an execution screen of a first application on the first display, based on the direction information, determining whether the electronic device is turned over while an angle between the first body part and the second body part is maintained being smaller than or equal to a first predetermined critical angle, determining a second application of which an execution screen is to be displayed on the second display among a plurality of applications stored in the electronic device, based on determining that the electronic device is turned over while the angle between the first body part and the second body part is smaller than or equal to the first predetermined critical angle, wherein the second application is different from the first application, and displaying a first execution screen of the second application on the second display.

15. The operating method of claim 14, wherein the determining of the second application comprises:

determining whether a notification message is received; and based on determining that the notification message is received, determining an application related to the received notification message, as the second application.

* * * * *